United States Patent
Winn et al.

(10) Patent No.: US 10,531,061 B2
(45) Date of Patent: *Jan. 7, 2020

(54) GENERATING A COMPOSITE IMAGE FROM A PHYSICAL ITEM

(71) Applicant: Google LLC, Mountain View, CA (US)

(72) Inventors: Julia Winn, Mountain View, CA (US);
David Lieb, San Francisco, CA (US);
Eric Henry, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,647

(22) Filed: Apr. 3, 2019

(65) Prior Publication Data

US 2019/0230330 A1 Jul. 25, 2019

Related U.S. Application Data

(63) Continuation of application No. 15/350,840, filed on Nov. 14, 2016, now Pat. No. 10,257,485.
(Continued)

(51) Int. Cl.
*H04N 9/76* (2006.01)
*G06T 7/11* (2017.01)
(Continued)

(52) U.S. Cl.
CPC .............. *H04N 9/76* (2013.01); *G06T 7/11* (2017.01); *G06T 7/13* (2017.01); *H04N 1/00183* (2013.01);
(Continued)

(58) Field of Classification Search
CPC .............. H04N 1/00183; H04N 5/23238
See application file for complete search history.

(56) References Cited

U.S. PATENT DOCUMENTS

| 6,088,612 A | 7/2000 | Blair |
| 7,346,184 B1 | 3/2008 | Carr et al. |
| (Continued) | | |

FOREIGN PATENT DOCUMENTS

| WO | 1999038121 | 7/1999 |
| WO | 2015082572 | 6/2015 |

OTHER PUBLICATIONS

"Scan Documents with CamScanner", Retrieved from the Internet: https://features.en.softonic.com/scan-documents-with-camscanner, Jul. 28, 2014, 10 pages.

(Continued)

*Primary Examiner* — Christopher K Peterson
(74) *Attorney, Agent, or Firm* — IP Spring

(57) ABSTRACT

A computer-implemented method includes capturing, with a camera, a first image of a physical item at a first camera position, detecting borders associated with the physical item, based on the first image, generating an overlay that includes a plurality of objects that are positioned within one or more of the borders associated with the physical item, capturing, with the camera, subsequent images of the physical item, where each subsequent image is captured with a respective subsequent camera position, and during capture of the subsequent images, displaying an image preview that includes the overlay. The method further includes establishing correspondence between pixels of the first image and pixels of each of the subsequent images and generating a composite image of the physical item, where each pixel value of the composite image is based on corresponding pixel values of the first image and the subsequent images.

20 Claims, 14 Drawing Sheets

Related U.S. Application Data

(60) Provisional application No. 62/347,572, filed on Jun. 8, 2016.

(51) Int. Cl.
*G06T 7/13* (2017.01)
*H04N 5/235* (2006.01)
*H04N 5/262* (2006.01)
*H04N 1/00* (2006.01)
*H04N 5/232* (2006.01)
*H04N 9/07* (2006.01)
*H04N 9/73* (2006.01)

(52) U.S. Cl.
CPC ....... *H04N 5/2356* (2013.01); *H04N 5/23222* (2013.01); *H04N 5/23238* (2013.01); *H04N 5/23293* (2013.01); *H04N 5/262* (2013.01); *H04N 9/07* (2013.01); *H04N 9/735* (2013.01); *G06T 2207/10024* (2013.01); *H04N 5/23267* (2013.01)

(56) References Cited

U.S. PATENT DOCUMENTS

| | | | |
|---|---|---|---|
| 8,805,125 | B1 | 8/2014 | Kumar et al. |
| 9,270,885 | B2 | 2/2016 | Rapoport et al. |
| 9,325,861 | B1 | 4/2016 | Ettinger |
| 9,626,589 | B1 | 8/2017 | Graham et al. |
| 10,257,485 | B2 * | 4/2019 | Winn .................. H04N 5/2356 |
| 2011/0312374 | A1 | 12/2011 | Chen et al. |
| 2012/0194637 | A1 * | 8/2012 | Han .................. H04N 5/23232 348/36 |
| 2014/0118483 | A1 | 5/2014 | Rapoport et al. |

OTHER PUBLICATIONS

EPO, Written Opinion of the International Preliminary Examining Authority for International Patent Application No. PCT/US2016/061848, dated Jul. 31, 2018, 12 pages.

EPO, Written Opinion of the International Preliminary Examining Authority for International Patent Application No. PCT/US2016/061848, dated May 15, 2018, 13 pages.

European Patent Office, International Search Report and Written Opinion for International Patent Application No. PCT/US2016/061848, dated Feb. 10, 2017, 20 pages.

International Bureau of WIPO, International Preliminary Report on Patentability for International Patent Application No. PCT/US2016/061848, dated Dec. 11, 2018, 14 pages.

USPTO, Non-final Office Action for U.S. Appl. No. 15/350,840, dated May 17, 2018, 12 pages.

USPTO, Restriction Requirement for U.S. Appl. No. 15/350,840, dated Mar. 9, 2018, 6 pages.

USPTO, Notice of Allowance for U.S. Appl. No. 15/350,840, dated Nov. 21, 2018, 9 pages.

* cited by examiner

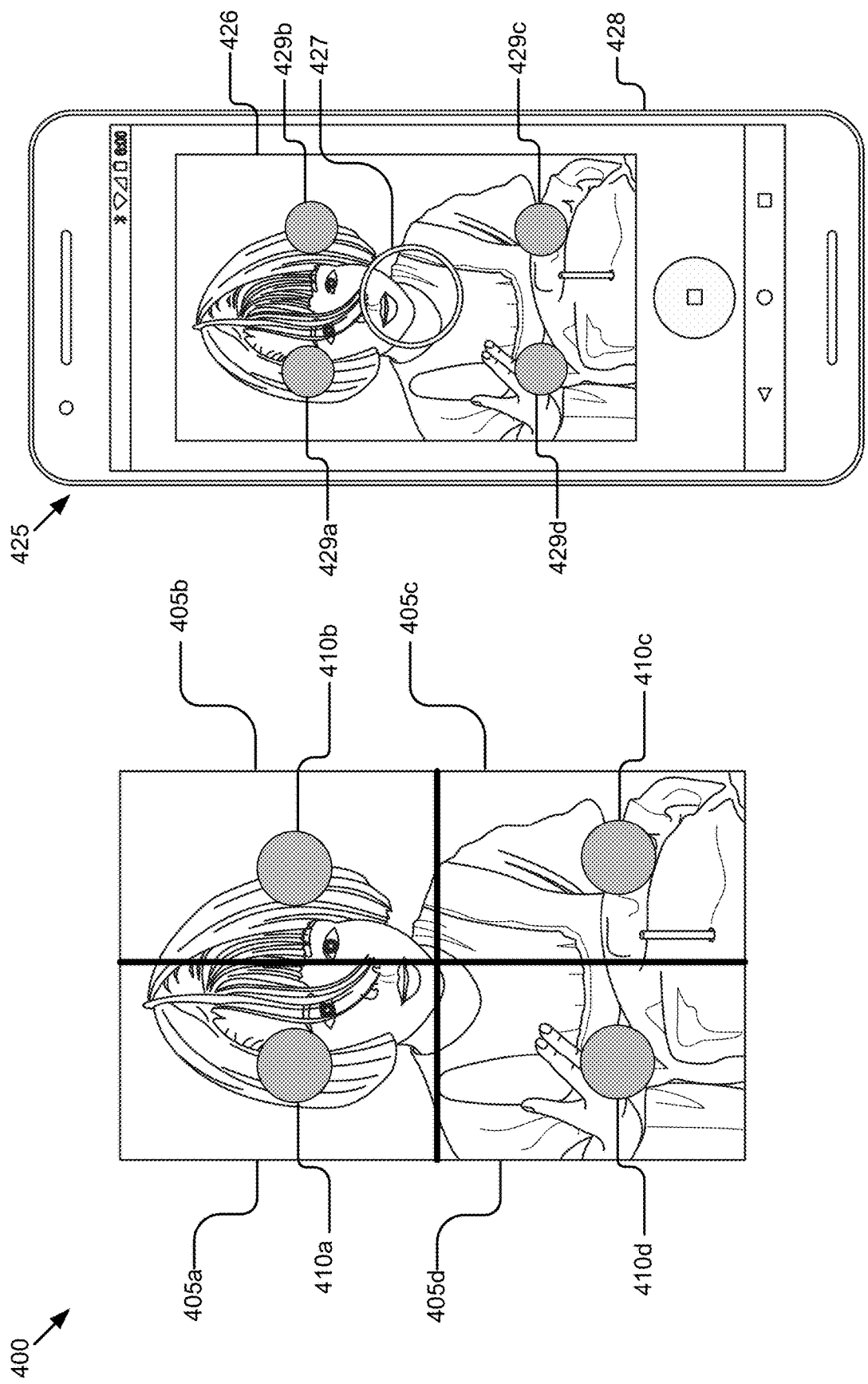

GENERATING A COMPOSITE IMAGE FROM A PHYSICAL ITEM

CROSS REFERENCE TO RELATED APPLICATIONS

The present application is a continuation of U.S. patent application Ser. No. 15/350,840, filed Nov. 14, 2016 and titled GENERATING A COMPOSITE IMAGE FROM A PHYSICAL ITEM, which claims priority to U.S. Provisional Patent Application No. 62/347,572, filed Jun. 8, 2016 and titled GENERATING AN ELECTRONIC IMAGE FROM A PHYSICAL OBJECT, both of which are incorporated herein by reference in their entirety.

BACKGROUND

People frequently own physical photographs that memorialize important events in their lives. It may be advantageous to convert the physical photographs into electronic versions. For example, the physical photographs are vulnerable because people may lose them or they may get destroyed. People may prefer electronic versions that they could share, search, and organize into electronic photo albums. However, it may be difficult to convert the physical photographs into attractive images.

When capturing images of the physical photographs with a camera, light may reflect off the physical photograph and be captured by the camera in such a manner that the images includes glare. The glare may be present due to the relative position of the light source, physical photograph, and camera. The glare may also be caused by the use of a flash during image capture. Glare is interpreted as a low quality image, since image detail is missing in portions with glare. For example, FIG. 1 illustrates how a converted image 100 may include glare 101 as a result of overhead light sources on the physical photograph at the time of capture.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations generally relate to a computer-implemented method to generate a composite image. The method includes capturing, with a camera, a first image of a physical item at a first camera position. The method further includes detecting borders associated with the physical item. The method further includes, based on the first image, generating an overlay that includes a plurality of objects that are positioned within one or more of the borders associated with the physical item. The method further includes capturing, with the camera, subsequent images of the physical item, wherein each subsequent image is captured with a respective subsequent camera position. The method further includes during capture of the subsequent images, displaying an image preview that includes the overlay. The plurality of objects remains fixed in the overlay as the camera is moved. In response to a predetermined number of captures of subsequent images at each respective subsequent camera position, an attribute of an object of the plurality of objects is updated. Updating the attribute of the plurality of objects corresponds to a completion of capture. The method further includes establishing correspondence between pixels of the first image and pixels of each of the subsequent images. The method further includes generating a composite image of the physical item, where each pixel value of the composite image is based on corresponding pixel values of the first image and the subsequent images.

In some implementations, the overlay further comprises a reticle, the reticle moves responsive to moving the camera, and the subsequent images are captured responsive to at least a portion of the reticle overlapping with the object. In some implementations, the overlay further includes an arrow that points to a direction to move the reticle. In some implementations, responsive to a size of the first image exceeding a predetermined threshold value, dividing the overlay into sections and positioning each of the plurality of objects in a center of a respective section. In some implementations, responsive to at least one of a confidence value associated with detection of the first image exceeding a threshold confidence value, dividing the overlay into sections and positioning each of the plurality of objects in a center of a respective section. In some implementations, the attribute is color and updating the color of the plurality of objects causes an indication of completion to appear. In some implementations, responsive to updating the attribute of the object of the plurality of objects, the object is removed from the overlay. In some implementations, each pixel value of the composite image is a minimum value of the corresponding pixel values of the first image and the subsequent images. In some implementations, generating the composite image further includes for each pixel value of the composite image, selecting a tentative pixel value and comparing the tentative pixel value to surrounding pixel values for pixels that surround a pixel corresponding to the pixel value to confirm that each of the surrounding pixel values is within a threshold difference of the tentative pixel value. In some implementations, responsive to a difference between the tentative pixel value and one of the surrounding pixel values exceeding the threshold difference, modifying the tentative pixel value to be within the threshold difference.

In some implementations, a system comprises one or more processors and a memory that stores instructions executed by the one or more processors, the instructions comprising: capturing a first image of a physical item with a camera, displaying the first image with a color overlay over a first portion of the first image, capturing one or more subsequent images of the physical item, wherein each subsequent image is captured as the camera is moved with reference to the physical item, during capture of each of the subsequent images, displaying the first image with the color overlay over a second portion of the first image, wherein the second portion includes the first portion and an additional portion determined based on movement of the camera, establishing correspondence between pixels of the first image and pixels of each of the one or more subsequent images, and generating a composite image of the physical item, wherein each pixel value of the composite image is based on corresponding pixel values of the first image and the one or more subsequent images.

In some implementations, the instructions further comprise converting the first image to a preset aspect ratio, responsive to the first image being at least one of upside down and sideways, modifying the first image to be right-side up, and applying white balance to correct a composition of the first image. In some implementations, the overlay further includes a target that is positioned to indicate a direction to move the camera. In some implementations, the target moves as the camera moves.

In some implementations, the method may include a means for capturing, with a camera, a first image of a physical item at a first camera position. The method may further include a means for detecting borders associated with the physical item. The method may further include, based on the first image, a means for generating an overlay that includes a plurality of objects that are positioned within one or more of the borders associated with the physical item. The method may further include a means for capturing, with the camera, subsequent images of the physical item, wherein each subsequent image is captured with a respective subsequent camera position. The method may further include during capture of the subsequent images, a means for displaying an image preview that includes the overlay. The plurality of objects remains fixed in the overlay as the camera is moved. In response to a predetermined number of captures of subsequent images at each respective subsequent camera position, a color of an object of the plurality of objects is updated. Updating the color of the plurality of objects corresponds to a completion of capture. The method may further include a means for establishing correspondence between pixels of the first image and pixels of each of the subsequent images. The method may further includes a means for generating a composite image of the physical item, where each pixel value of the composite image is based on corresponding pixel values of the first image and the subsequent images.

The system and methods described below advantageously solve the problem of glare and artifacts that result from capturing images of physical items. In addition, the system and methods described below may reduce or eliminate blur from a shaky hand capturing the images.

A technical advantage of the application is that the system and methods described below generate a user interface that provides guidance to a user to capture images that result in generating a high-quality composite image. For example, the user interface provides indicators for optimal distance between the physical item and a mobile device that captures the images. Further, the user interface provides indicators to adjust the orientation of the mobile device so that the captured image does not have a trapezoid artifact, for example, by positioning the mobile device parallel to the plane of the physical item.

In addition, the system and methods avoid providing complicated instructions to a user about how to capture images of a physical item by creating a game of capturing the images. The user interface guides the user to move the mobile device horizontally and vertically so that subsequent images are captured. For example, the user may enjoy moving the mobile device to cover dots in an overlay with a reticle. In another example, the user may enjoy moving the mobile device to make it look like a color is being spray painted onto the image. The user interface also guides the user to move the mobile device slowly while images are captured to prevent the capture of blurry images.

Another technical advantage is that the system and methods eliminate glare and artifacts by generating a composite image. Multiple images of the physical item are captured from different camera positions, for example, by moving a camera relative to the physical item. The captured images are combined and the pixel values are selected from the captured images to reduce or eliminate glare. The composite image includes pixel values determined from actual captured images and not approximated from neighboring pixel values that could themselves include glare.

Yet another technical advantage is that image capture can be performed in any lighting condition and does not need specific configuration of a light source, camera, and the physical item. In addition, the system and methods may be performed by a mobile device instead of specialized equipment, such as a flat-bed scanner.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A illustrates a graphic representation of an image including four dots that are each in a detected quadrant.

FIG. 4B illustrates a graphic representation of a mobile device displaying an overlay and an image in a portrait orientation.

DETAILED DESCRIPTION

In some implementations, a camera captures a first image of a physical item. For example, the physical item is a photograph. Borders associated with the physical item are detected. For example, photographs are typically shaped like a rectangle and the borders may be of a rectangle. An overlay may be generated based on the first image that includes objects and a reticle where the objects are positioned within the borders associated with the physical item. For example, the first image includes four blue dots positioned at the edges of a rectangle and a reticle in the center.

Subsequent images of the physical item are captured, where each subsequent image is captured with a respective subsequent camera position. For example, a user may tilt and rotate the camera to capture subsequent images at different angles. During capture of the subsequent images, an image preview that includes the overlay is displayed. The plurality of objects remain fixed in the overlay as the camera is moved. The reticle moves responsive to moving the camera. The subsequent images are captured responsive to at least a portion of the reticle overlapping with one of the objects. For example, the user may move the camera to an object in the lower left-hand corner.

In response to a predetermined number of captures of subsequent images at each respective subsequent camera position, an attribute of the object is updated. For example, the blue dot changes to a gray dot. A completion of capture occurs responsive to moving the reticle until the attribute of the plurality of objects is updated. For example, the user moves the reticle from a first object to a second object in the lower right-hand corner, then to a third object in the upper right-hand corner, and then to a fourth object in the upper left-hand corner. Once all the objects change to gray, the capture is complete. In some implementations, after the color of the objects is updated, an indication of completion appears. For example, a greet circle with a checkmark is displayed.

Example System

Figure 1:
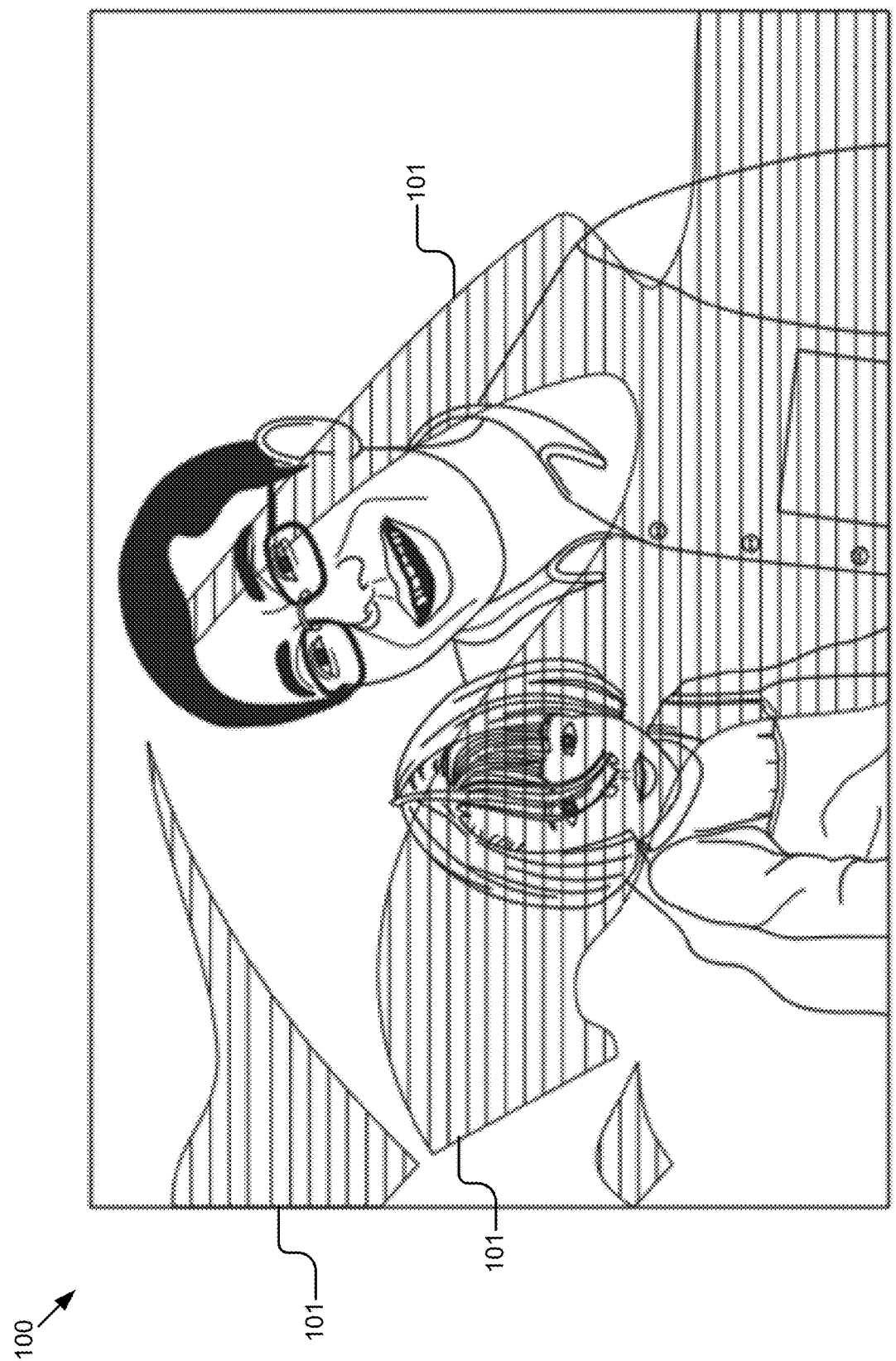
FIG. 1 illustrates a prior art graphic representation of a photograph.
Figure 2:
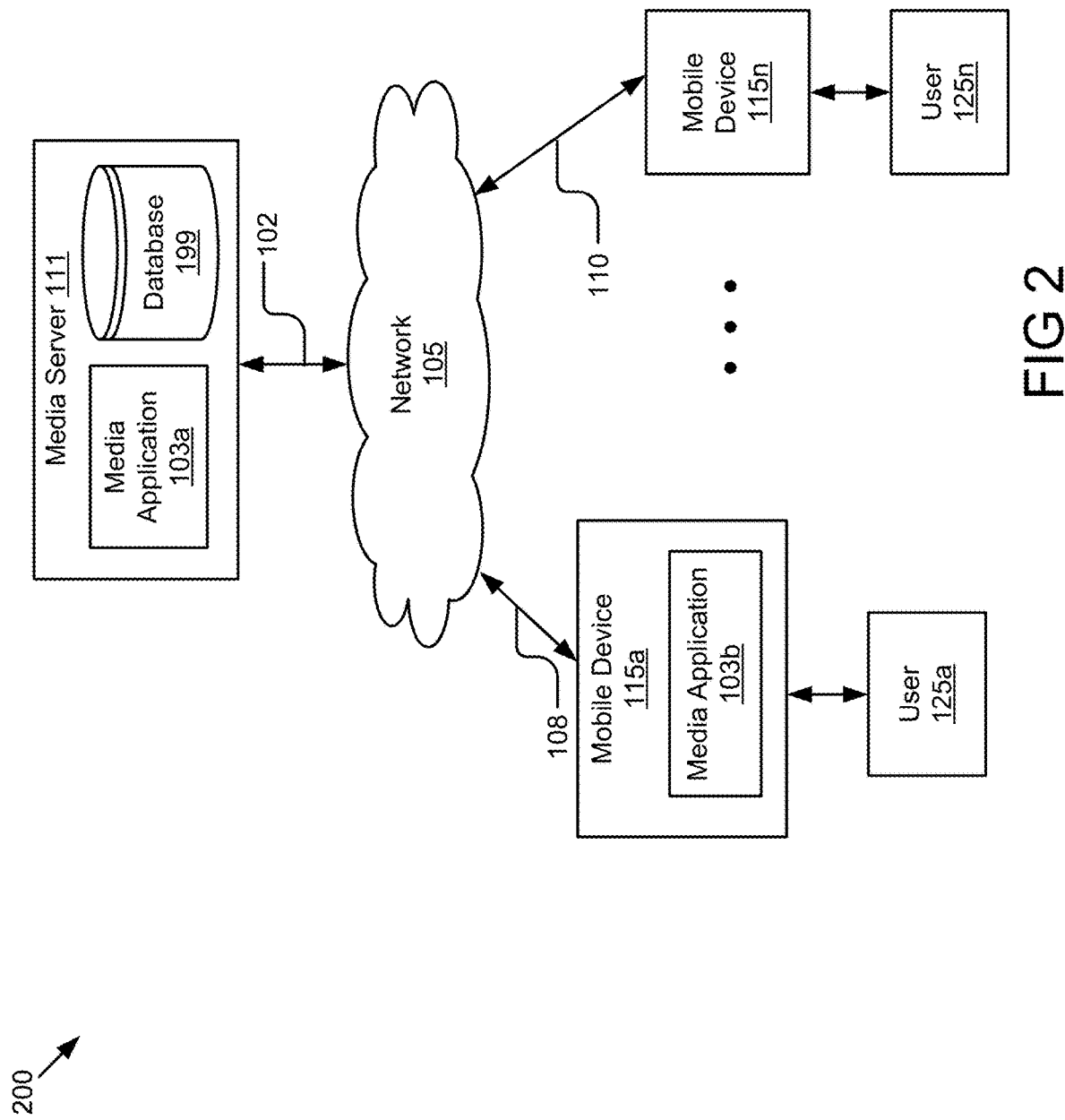
FIG. 2 illustrates a block diagram of an example system that generates a composite image from a physical item according to some implementations.

FIG. 2 illustrates a block diagram of an example system 200 that generates composite images. The illustrated system 200 includes a media server 111, mobile devices 115a, 115n, and a network 105. Users 125a, 125n may be associated with respective mobile devices 115a, 115n. In some implementations, the system 200 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the system 200 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the mobile devices 115 and the media server 111, in practice one or more networks 105 may be coupled to these entities.

The media server 111 may include a processor, a memory, and network communication capabilities. In some implementations, the media server 111 is a hardware server. The media server 111 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some implementations, the media server 111 sends and receives data to and from one or more of the mobile devices 115a, 115n via the network 105. The media server 111 may include a media application 103a and a database 199.

The media application 103a may be code and routines operable to generate composite images. In some implementations, the media application 103a may be implemented using hardware including a field-programmable gate array (FPGA) or an application-specific integrated circuit (ASIC). In some implementations, the media application 103a may be implemented using a combination of hardware and software.

The database 199 may store images captured by users 125 associated with mobile devices 115 and composite images generated from the images. In some implementations, the database 199 may store composite images that were generated independent of the mobile devices 115. The database 199 may also store social network data associated with users 125, user preferences for the users 125, etc.

The mobile device 115 may be a computing device that includes a memory, a hardware processor, and a camera. For example, the mobile device may include a tablet computer, a mobile telephone, a wearable device, a head-mounted display, a mobile email device, a portable game player, a portable music player, a reader device, or another electronic device capable of accessing a network 105.

In the illustrated implementation, mobile device 115a is coupled to the network 105 via signal line 108 and mobile device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. Mobile devices 115a, 115n are accessed by users 125a, 125n, respectively. The mobile devices 115a, 115n in FIG. 1 are used by way of example. While FIG. 1 illustrates two mobile devices, 115a and 115n, the disclosure applies to a system architecture having one or more mobile devices 115.

In some implementations, the mobile device 115 can be a mobile device that is included in a wearable device worn by the user 125. For example, the mobile device 115 is included as part of a clip (e.g., a wristband), part of jewelry, or part of a pair of glasses. In another example, the mobile device 115 can be a smart watch. The user 125 may view images from the media application 103 on a display of the device worn by the user 125. For example, the user 125 may view the images on a display of a smart watch or a smart wristband.

In some implementations, media application 103b may be stored on a mobile device 115a. The media application 103 may include a thin-client media application 103b stored on the mobile device 115a and a media application 103a that is stored on the media server 111. For example, the media application 103b stored on the mobile device 115a may capture the images that are transmitted to the media application 103a stored on the media server 111 where a composite image is generated from the images. The media application 103a may transmit the composite image to the media application 103b for display on the mobile device 115a. In another example, the media application 103b stored on the mobile device 115a may generate the composite image and transmit the composite image to the media application 103a stored on the media server 111. The media application 103a stored on the media server 111 may include the same components or different components as the media application 103b stored on the mobile device 115a.

In situations in which the systems and methods discussed herein may collect or use personal information about users (e.g., user data, information about a user's social network, user's location, user's biometric information, user's activities and demographic information, the media server stores and analyzes videos), users are provided with opportunities to control whether information is collected, whether the personal information is stored, whether the personal information is used, whether the videos are analyzed, and how the information about the user is collected, stored, and used. That is, the systems and methods discussed herein collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity information may be treated, e.g., anonymized, so that no personally identifiable information can be determined from a video. As another example, a user's geographic location may be generalized to a larger region so that the user's particular location cannot be determined.

Example Computing Device

Figure 3:
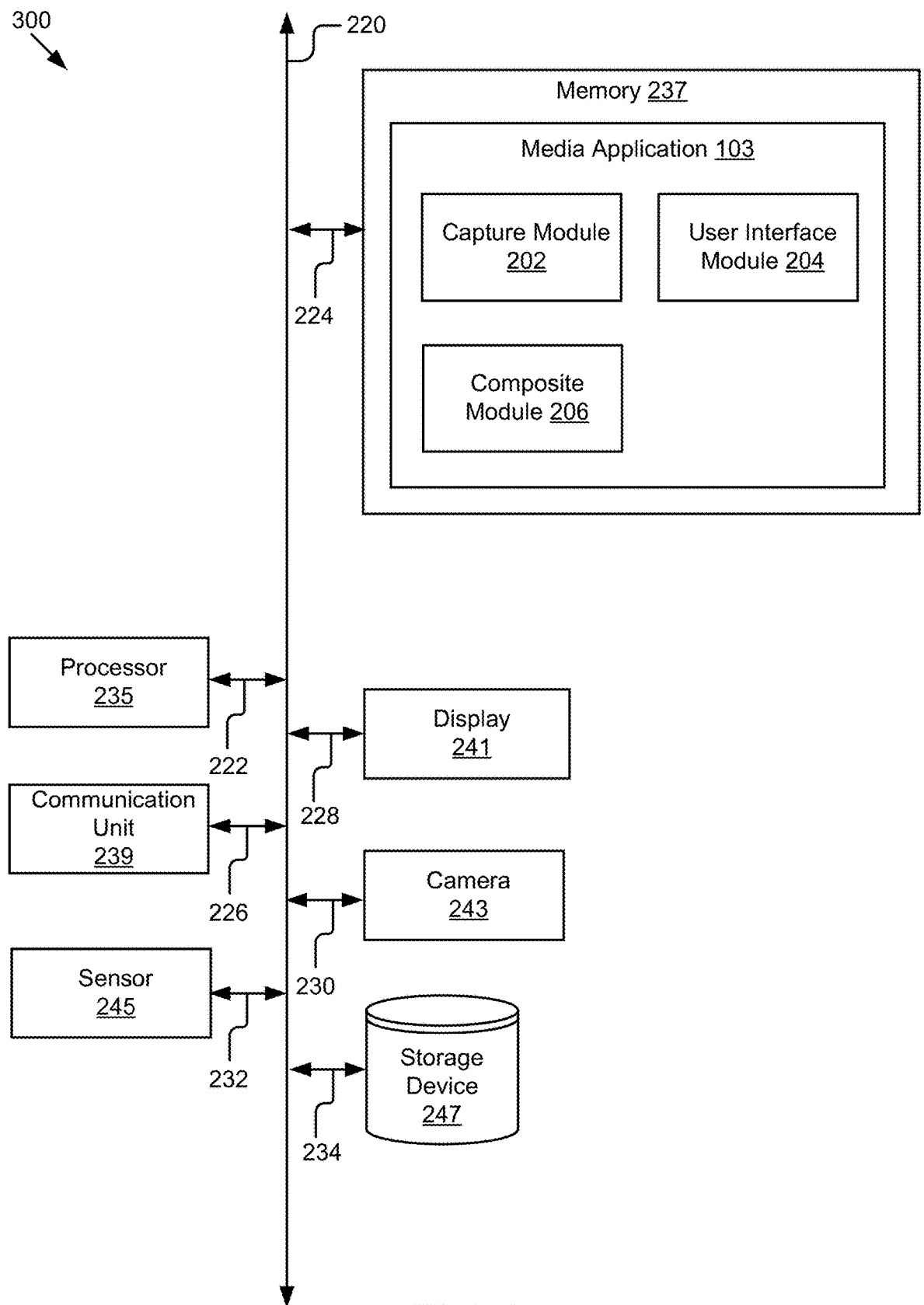
FIG. 3 illustrates a block diagram of an example computing device that generates a composite image from a physical item according to some implementations.

FIG. 3 illustrates a block diagram of an example computing device 300 that generates composite images. The computing device 300 may be a media server 111 or a mobile device 115. The computing device 300 may include a processor 235, a memory 237, a communication unit 239, a display 241, a camera 243, a sensor 245, and a storage device 247. Additional components may be present or some of the previous components may be omitted depending on the type of computing device 300. For example, if the computing device 300 is the media server 111, the computing device 300 may not include the display 241, the camera 243, or the sensor 245. A media application 103 may be stored in the memory 237. In implementations where the computing device 300 is a wearable device, the computing device 300 may not include storage device 247. In some implementations, the computing device 300 may include other components not listed here, such as a battery, etc. The components of the computing device 300 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 300. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the media application 103, which is described in greater detail below. The memory 237 is coupled to the bus 220 for communication with the other components via signal line 224.

The communication unit 239 transmits and receives data to and from at least one of the mobile device 115 and the media server 111 depending upon where the media application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the mobile device 115 or the media server 111, depending on where the media application 103 may be stored. In some implementations, the communication unit 239 includes a wireless transceiver for exchanging data with the mobile device 115, media server 111, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the media application 103. For example, the display 241 may render graphics to display an overlay and a resulting composite image. The display 241 is coupled to the bus 220 for communication with the other components via signal line 228.

The camera 243 may include hardware operable to capture images of physical items. For example, the camera 243 may include a lens, a sensor, and an image signal processor. The lens may capture an optical image. The sensor may convert the optical image to electrical signals. The image signal processor may perform demosaicing on the electrical signals to determine pixel color and control image effects, such as autofocus, exposure, and white balance. The camera 243 may transmit the images to the media application 103 or to the storage device 247. The camera 243 may be coupled to the bus 220 via signal line 230.

The sensor 245 may include hardware operable to determine a change in position of the mobile device 115. For example, the sensor 245 may include motion sensors that measure acceleration forces and rotational forces along the x, y, and z-axes, such as an accelerometer and a gyroscope. The sensor 245 may also include position sensors that measure the physical position of the mobile device 115, such as orientation sensors and magnetometers. The sensor 245 is coupled to the bus 220 for communication and with the other components via signal line 232.

The storage device 247 may be a non-transitory computer-readable storage medium that stores data that provides the functionality described herein. In implementations where the computing device 300 is the media server 111, the storage device 247 may include the database 199 in FIG. 1. The storage device 247 may be a DRAM device, a SRAM device, flash memory or some other memory device. In some implementations, the storage device 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 234.

The media application 103 may include a capture module 202, a user interface module 204, and a composite module 206.

The capture module 202 processes an image captured by the camera 243. In some implementations, the capture module 202 includes a set of instructions executable by the processor 235 to process the images. In some implementations, the image processing module 202 is stored in the memory 237 of the computing device 300 and can be accessible and executable by the processor 235.

The capture module 202 receives a first image of a physical item at a first camera position from the camera 243. For example, a user of a mobile device 115 that includes a camera 243 positions the mobile device 115 over a physical item and selects an option to capture the first image. The physical item may include, for example, a photograph, a billboard, a document, a restaurant menu, etc.

The capture module 202 may perform processing of the first image. For example, the capture module 202 may crop the first image or modify the first image to fit a particular aspect ratio. The aspect ratio may include, for example, 1:1, 4:3, 16:9, etc. The capture module 202 may identify a direction of the first image (e.g., upside down, sideways, etc.) and rotate the first image to be right-side up. The capture module 202 may apply white balance to correct a composition of the first image.

The capture module 202 detects borders associated with the physical item. For example, the capture module 202 may determine that the physical item has a rectangular shape with four borders. Other shapes are possible. For example, the physical item may have a triangular shape, a square shape, a circular shape, an oval shape, a rhombus shape, etc. The user interface module 204 may include user instructions on how to position the mobile device 115 over the physical item. For example, the instructions may include the following text: "Position your photo such that all four corners can be seen." This may help the capture module 202 to detect the borders.

The capture module 202 instructs the user interface module 204 to display an overlay with objects that are positioned within the borders associated with the physical item. In some implementations, the capture module 202 divides the first image into sections and instructs the user interface module 204 to display an overlay with objects that are each in the center of one of the sections. For example, photographs may be divided into quadrants and each quadrant may include a dot at the center of each of the quadrants. In another example, the first image may be divided into a different number of sections, such as five sections, or a triangular-shaped physical item may be divided into three differently shaped sections, etc. FIG. 4A illustrates a graphic representation 400 of an image including four dots 405$a$, 405$b$, 405$c$, 405$d$ that are each in a detected quadrant 410$a$, 410$b$, 410$c$, 410$d$. The objects may include a variety of different shapes, such as circles, ovals, squares, rectangles, parallelograms, etc.

The capture module 202 may determine a size of the first image. In some implementations, the capture module 202 may determine the size of the first image as a percentage of the area of the screen of the mobile device 115. If the size of the first image exceeds a predetermined threshold value, the capture module 202 may instruct the user interface module 204 to display an overlay that is divided into sections with an object at the center of the section. If the size of the first image fails to exceed the predetermined threshold value, the capture module 202 may instruct the user interface module 204 to include an overlay with default objects, such as dots. The default objects may not align with divided sections of the first image, but may help guide a user to position the mobile device 115 in a way to capture subsequent images for creating a composite image. In some implementations, if the default objects result in a composite image that includes extraneous content, such as a background behind a physical item, the user interface module 204 may include a cropping option for cropping out the extraneous content.

The capture module 202 may assign a confidence value associated with detection of the first image. The confidence value may reflect a confidence of a detection of the borders of the physical item. If the confidence value exceeds a predetermined threshold value, the capture module 202 may instruct the user interface module 204 to display an overlay that is divided into sections with an object at the center of the section. If the confidence value fails to exceed the threshold confidence value, the capture module 202 may instruct the user interface module 204 to include an overlay with default objects. In some implementations, the overlay may be divided into sections based on a combination of the size of the first image and a confidence value associated with the first image.

In some implementations, the overlay includes a reticle. The reticle may form a variety of shapes, however, the reticle is displayed as an outline. The reticle may stay a fixed size, regardless of the size of the objects in the overlay. In some implementations, the reticle moves responsive to a user moving a mobile device 115. Moving the reticle so that some or all of the reticle overlaps with one of the objects causes the mobile device 115 to capture a subsequent image. For example, where the first image is divided into four quadrants, moving the reticle to overlap with the four dots results in four subsequent images being captured by the mobile device 115. The objects may remain in fixed positions in the overlay as the mobile device 115 is moved (e.g., with respect to a displayed image of the physical item). The size of the object may change depending on a distance between the mobile device 115 and the physical item. For example, the size of the object may increase as the mobile device 115 moves closer to the physical item to act as a guide for how close the mobile device 115 gets to the physical item. Guiding the user to move the mobile device 115 closer to physical items advantageously ensures that the images are of a higher quality than if the user kept the mobile device 115 further away from the physical item.

FIG. 4B illustrates a graphic representation 425 of a mobile device displaying an overlay 426 and an image. In this example, a reticle 427 is included in the center of the overlay 426 as a starting point. Once the first image is captured, the user interface module 204 displays an image preview that includes the overlay. Moving the mobile device 428 causes the reticle 427 to move. The objects 429a, 429b, 429c, and 429d remain stationary while the reticle 427 moves. As a result, the reticle 427 may be moved to surround or overlap the objects 429a, 429b, 429c, and 429d.

In some embodiments, once the reticle 427 surrounds or overlaps with an object 429, the reticle 427 is illustrated as a spinner that progressively changes color to illustrate an amount of time needed for the mobile device 115 to capture a predetermined number of captures of subsequent images at each respective subsequent camera position. For example, the camera 243 may capture a high-quality subsequent image for each quadrant while the mobile device 115 is positioned at each respective subsequent camera position. In some implementations, the camera 243 may capture the subsequent images until an event other than a predetermined number of subsequent images are captured. For example, the camera 243 may capture the subsequent images until the capture module 202 determines that a subsequent image is associated with a quality score that exceeds a predetermined value, a predetermined amount of time has passed, etc.

While the camera 243 captures the predetermined number of subsequent images, the reticle 427 may switch from a completely white outline to a portion of the white outline changing to blue (or another color) and progressively becoming more blue in a clockwise direction until a predetermined amount of time has passed, a predetermined number of subsequent images are captured, or the captured module 202 receives a signal from the camera 243 indicating that the subsequent image has been captured. In some implementations, an attribute of the object 429 that the reticle 427 surrounds or overlaps changes once the subsequent image is captured. For example, the object may change color, the object may flash, or the object may change size. When the attribute of the object changes, it may signal a completion of capture for the corresponding section. For example, in FIG. 4B, the reticle 427 surrounds the first object 429a until the subsequent image for the first quadrant is captured and the color of the object 429a changes from gray to blue. In some implementations where the user moves the camera 243 away from the physical item before the camera 243 has finished capturing the subsequent image or subsequent images, the capture module 202 may instruct the user interface module 204 to keep the reticle white as an indication that the capturing needs to be repeated for the corresponding object. In some implementations, if the user does not move the camera 243 to surround one of the objects with the reticle for more than a predetermined amount of time, such as 10 seconds, the capturing may be cancelled and the capture module 202 instructs the user interface module 204 to display instructions to the user to start the capturing over again. For example, the instructions may include: "Scan cancelled. Move circle to dot to finish scanning next time."

Figure 4D:
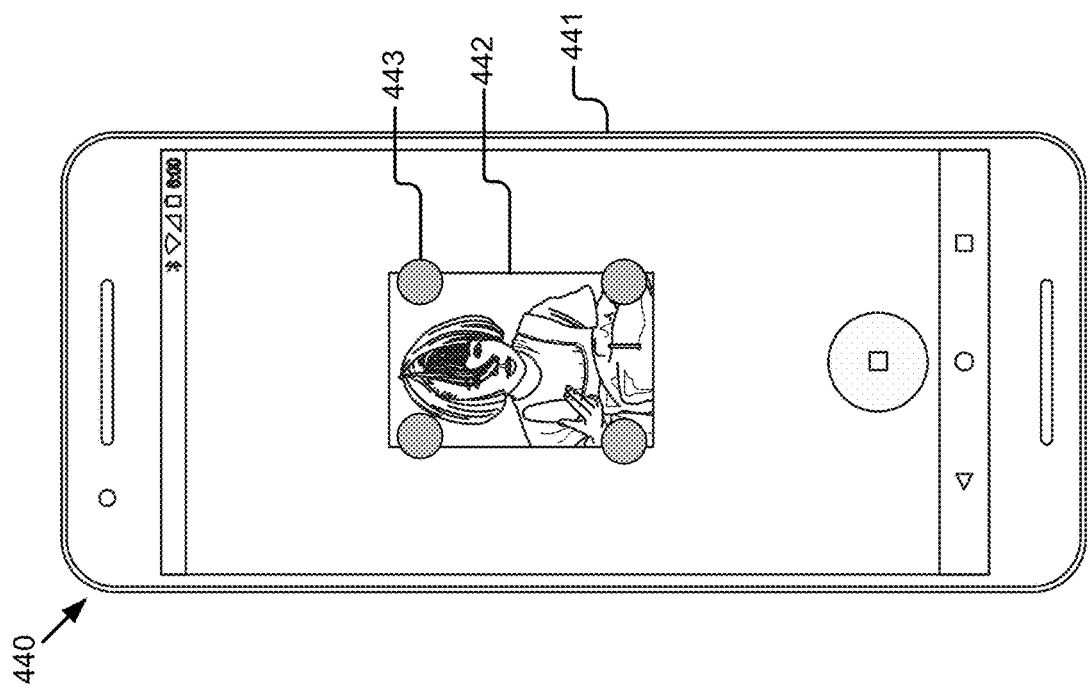
FIG. 4D illustrates a graphic representation of a mobile device displaying an overlay and a small image.
Figure 4C:
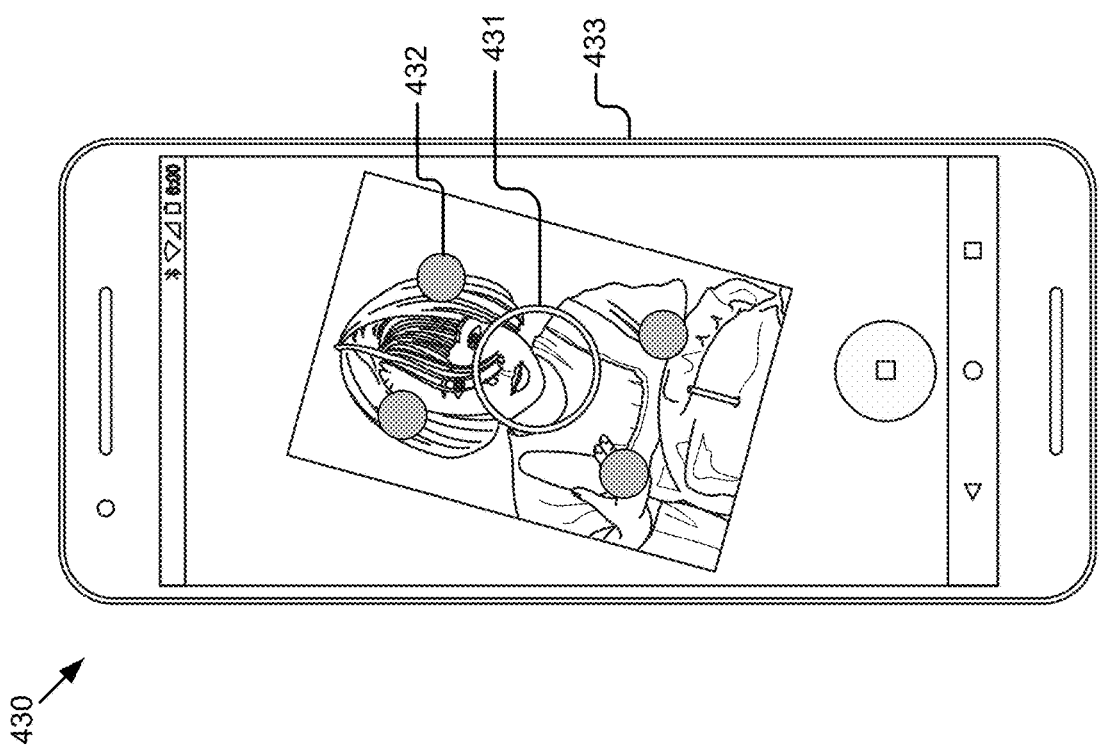
FIG. 4C illustrates a graphic representation of a mobile device displaying an overlay and a crooked image.

In some implementations, the objects in the overlay are parallel to the detected borders. Thus, if the physical item is captured at an angle, the objects in the overlay may be displayed at an angle as well. For example, FIG. 4C illustrates a graphic representation 430 of a mobile device 433 displaying an overlay and a crooked image. Because the reticle 431 is a fixed size while the objects 432 change size based on the size of the image, the size difference between the reticle 431 and the objects 432 provide a visual indicator to a user that the image is too small and that the mobile device 433 is to be moved closer to the photograph.

In some implementations, if the capture module 202 determines that the size of the image fails to exceed a predetermined threshold value, the capture module 202 may instruct the user interface module 204 to display default objects and/or to omit the reticle from the overlay. For example, FIG. 4D illustrates a graphic representation 440 of a mobile device 441 displaying an overlay and a small image 442. Because the size of the image fails to exceed the predetermined threshold, the objects 443 are default objects. The default objects are not at the center of each quadrant, however, the mobile device 115 may still capture the first image and the subsequent images. In another example, FIG. 4E illustrates a graphic representation 450 of a mobile device 451 displaying an overlay and no image. In this example, the capture module 202 instructs the user interface module 204 to display the overlay with the objects 452 even though no image is detected.

In some implementations, objects in the overlay may change shape as the mobile device 115 is moved. The shape may serve as an indicator to a user of the mobile device 115 to move the mobile device 115 to obtain optimal images. In some implementations, if the mobile device 115 is tiled more than 20 degrees relative to the physical item, the capture module 202 instructs the user interface module 204 to display default objects.

Figure 4F:
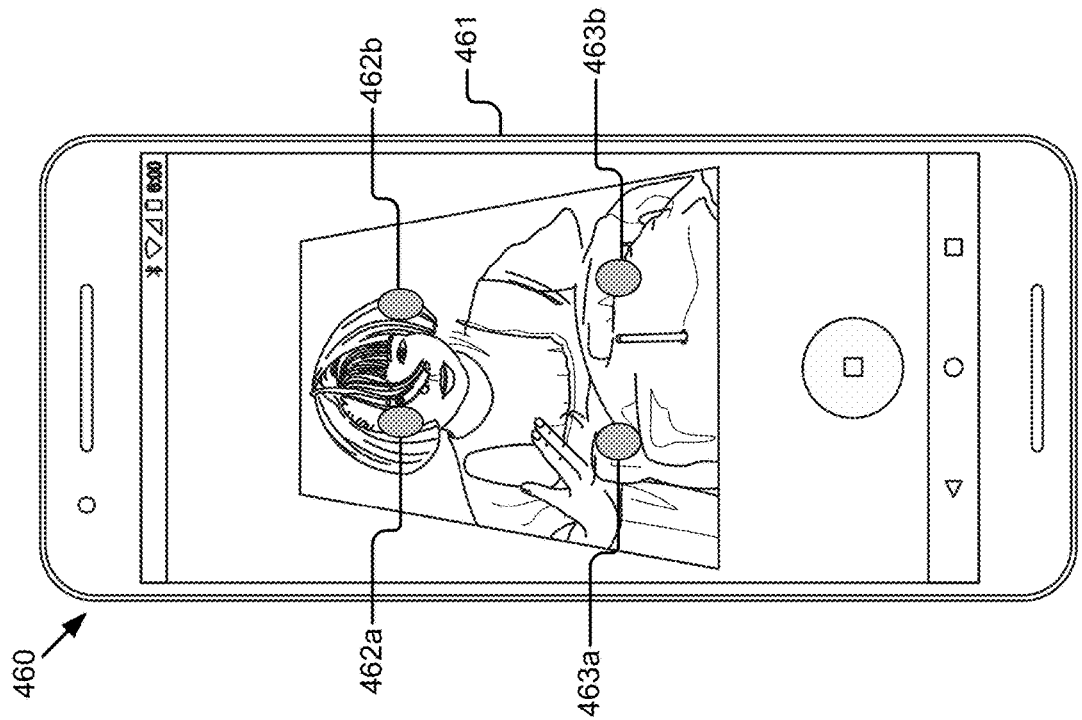
FIG. 4F illustrates a graphic representation of a mobile device displaying an overlay and an image at an angle.
Figure 4E:
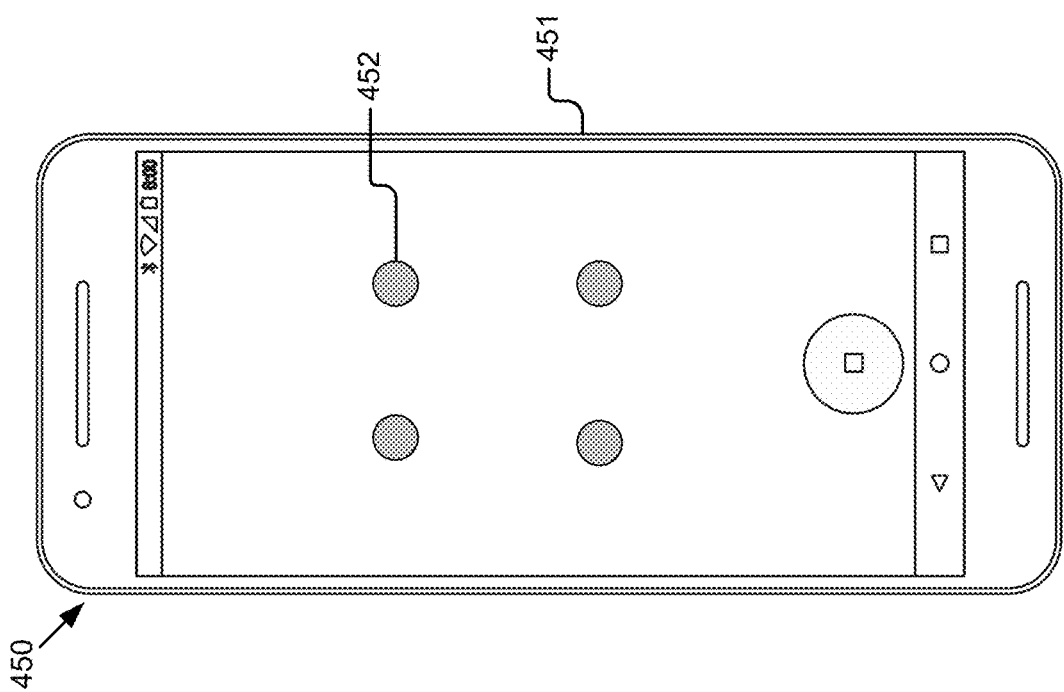
FIG. 4E illustrates a graphic representation of a mobile device displaying an overlay and no image.

FIG. 4F illustrates a graphic representation 460 of a mobile device 461 displaying an overlay and an image at an angle. In this example, the mobile device 461 is positioned at an angle relative to the photograph. The objects 462a, 462b at the top of the overlay form oval shapes to indicate that the mobile device 461 is to be tilted so that the mobile device 461 is parallel to the photograph. The objects 463a, 463b at the bottom of the overlay form ovals that are closer to circles to indicate that the bottom position of the mobile device 115 should only be tilted slightly to be parallel with the photograph.

Figure 4G:
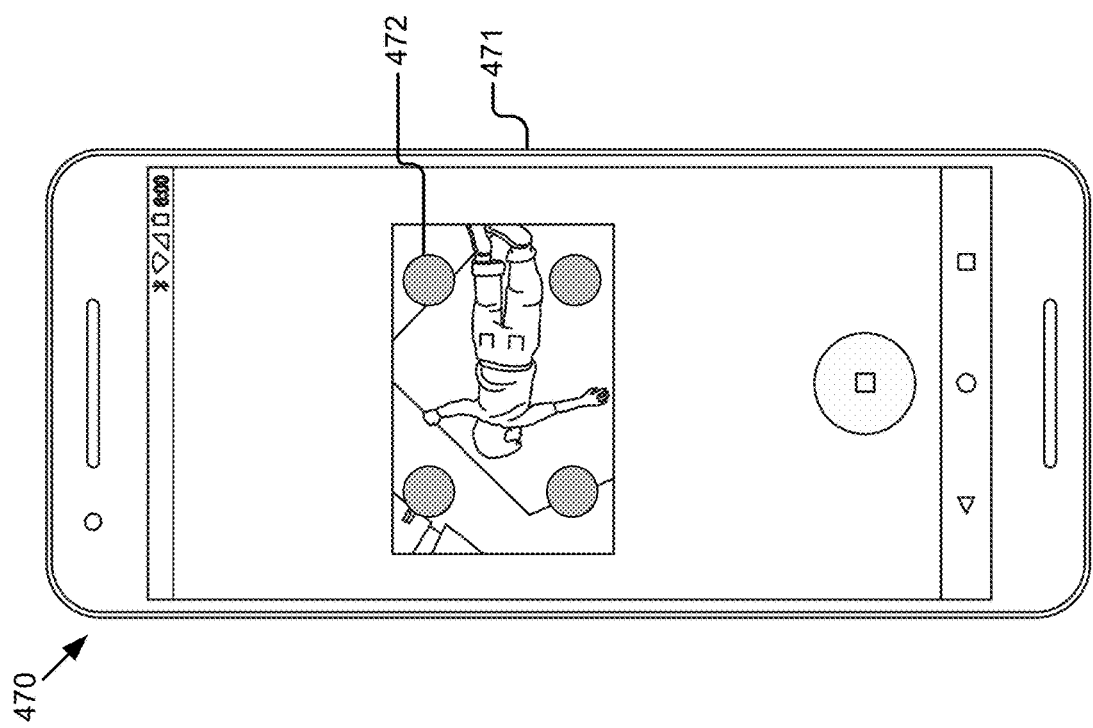
FIG. 4G illustrates a graphic representation of a mobile device displaying an overlay and an image with a landscape orientation.

The capture module 202 detects the borders of physical items with different shapes and orientations. For example, FIG. 4G illustrates a graphic representation 470 of a mobile device 471 displaying an overlay and an image with a landscape orientation. The capture module 202 identifies quadrants for the rectangular shape of the image and generates four objects 472 that are each positioned in the center of each quadrant.

In some implementations, the capture module 202 instructs the user interface module 204 to generate an overlay that is first displayed over a portion of an image and that increasingly covers the image as the mobile device 115 is moved and the camera 243 captures subsequent images. For example, the overlay may be a color overlay and the process may be presented as a game where a user moves the mobile device 115 as if spray painting a physical item. These implementations are discussed in greater detail below with reference to FIGS. 6A-6C.

The user interface module 204 generates a user interface. In some implementations, the user interface module 204 includes a set of instructions executable by the processor 235 to generate the user interface. In some implementations, the user interface module 204 is stored in the memory 237 of the computing device 300 and can be accessible and executable by the processor 235.

In some implementations, the user interface module 204 receives instructions from the capture module 202 to generate a user interface that includes an overlay that includes objects that are positioned within one or more of the borders associated with an image of a physical item. As the camera 243 captures subsequent images of the physical item, where each subsequent image is captured with a respective subsequent camera position, the user interface module 204 displays an image preview that includes the overlay. The plurality of objects remain fixed in the overlay as the camera is moved. In response to a predetermined number of captures of subsequent images at each respective subsequent camera position, the user interface module 204 may update an attribute of an object, such as changing the color of the object, causing the object to flash, changing the size of the object, etc. The user interface module 204 may continue to update the attribute of subsequent objects until all the objects are updated, which corresponds to a completion of capture. In some implementations, the user interface module 204 also generates a reticle that is part of the overlay and displays the reticle as moving responsive to the mobile device 115 moving. In this example, the color of an object is updated after the reticle surrounds or overlaps with the object and the predetermined number of captures of subsequent images at each respective subsequent camera position occurs. The process of capturing the first image and subsequent images until completion is illustrated in FIGS. 5A-5F as discussed in greater detail below.

Figure 5B:
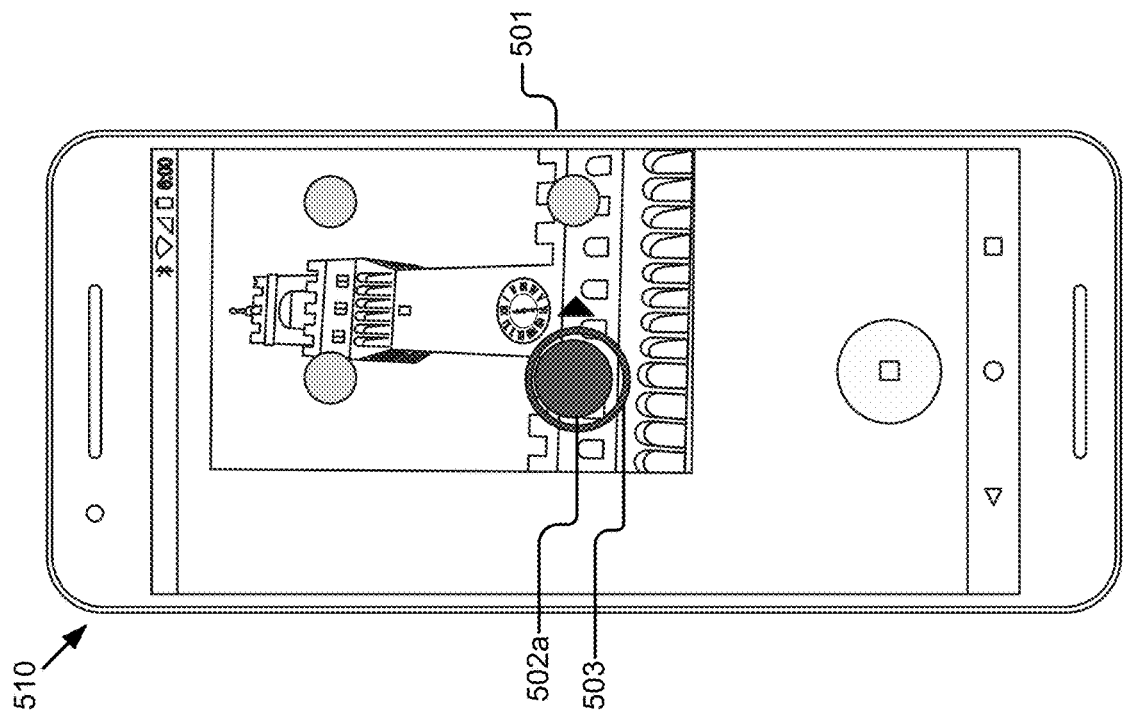
FIG. 5B illustrates a graphic representation of the mobile device displaying the overlay with the reticle surrounding a first object.
Figure 5A:
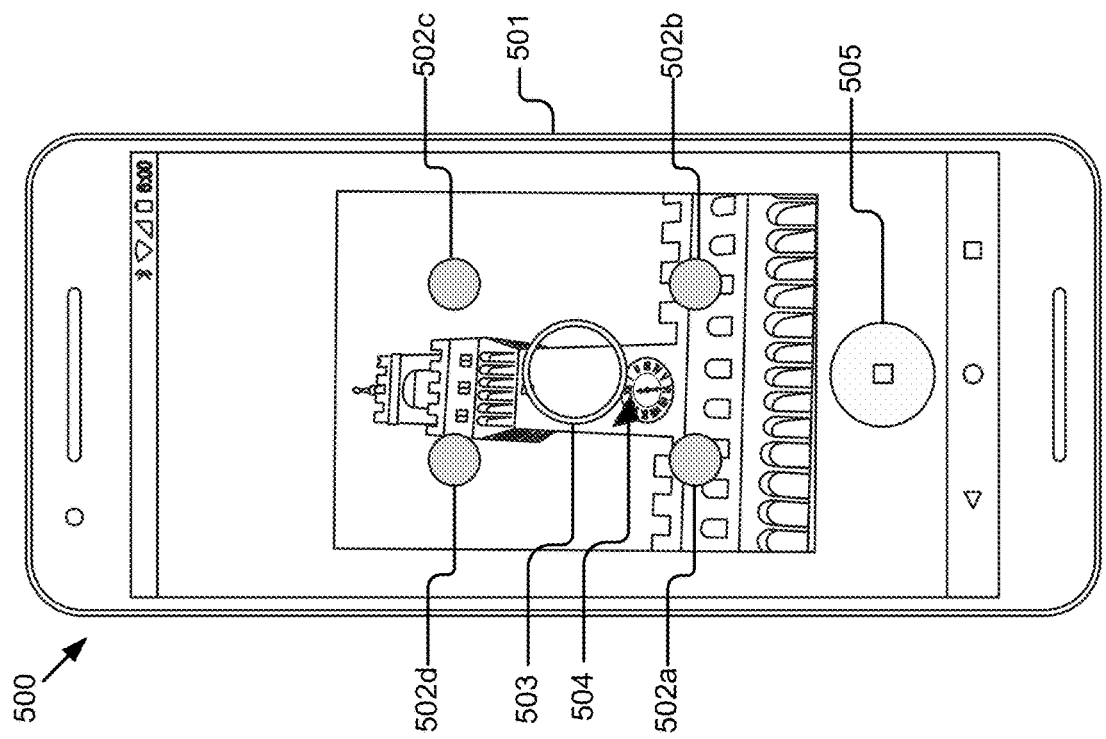
FIG. 5A illustrates a graphic representation of a mobile device displaying an overlay with four objects and a reticle.

FIG. 5A illustrates a graphic representation 500 of a mobile device 501 displaying an overlay with four objects 502a, 502b, 502c, 502d and a reticle 503 over a first image. In this example, the capture module 202 detected four borders and divided the first image into quadrants. The capture module 202 instructed the user interface module 204 to generate a user interface that includes an overlay that includes four objects 502a, 502b, 502c, 502d that are each at or near the center of one of the quadrants. The capture module 202 instructed the user interface module 204 to include a reticle 503. The reticle 503 is larger than the objects 502 because the mobile device 501 is parallel to a photograph and within a distance from the photograph that results in capturing a first image and subsequent images that are high-quality images. The overlay also includes an arrow 504 that points to a direction to move the reticle. In this example, the arrow 504 points to the first object 502a in the lower left-hand corner of the overlay. The user interface also includes a stop icon 505 that, responsive to selection by a user, stops the process. Selection of the stop icon 505, e.g., by a user touching the screen at the location of the stop icon 505, may pause the process or stop the process entirely. The stop icon 505 stays in a fixed position within the user interface.

FIG. 5B illustrates a graphic representation 510 of the mobile device 501 displaying the overlay with the reticle 503 surrounding or overlapping with a first object 502a. In this example, once the reticle 503 surrounds the first object 502a, the size of the first object 502a is enlarged to provide an indication to a user moving the mobile device 501 that the reticle 503 is recognized as surrounding the first object 502. In addition, the user interface module 204 update the first object 502a and the reticle 503 to a different color, such as blue to indicate that the subsequent image or subsequent images for the lower left-hand quadrant have been captured.

Figure 5D:
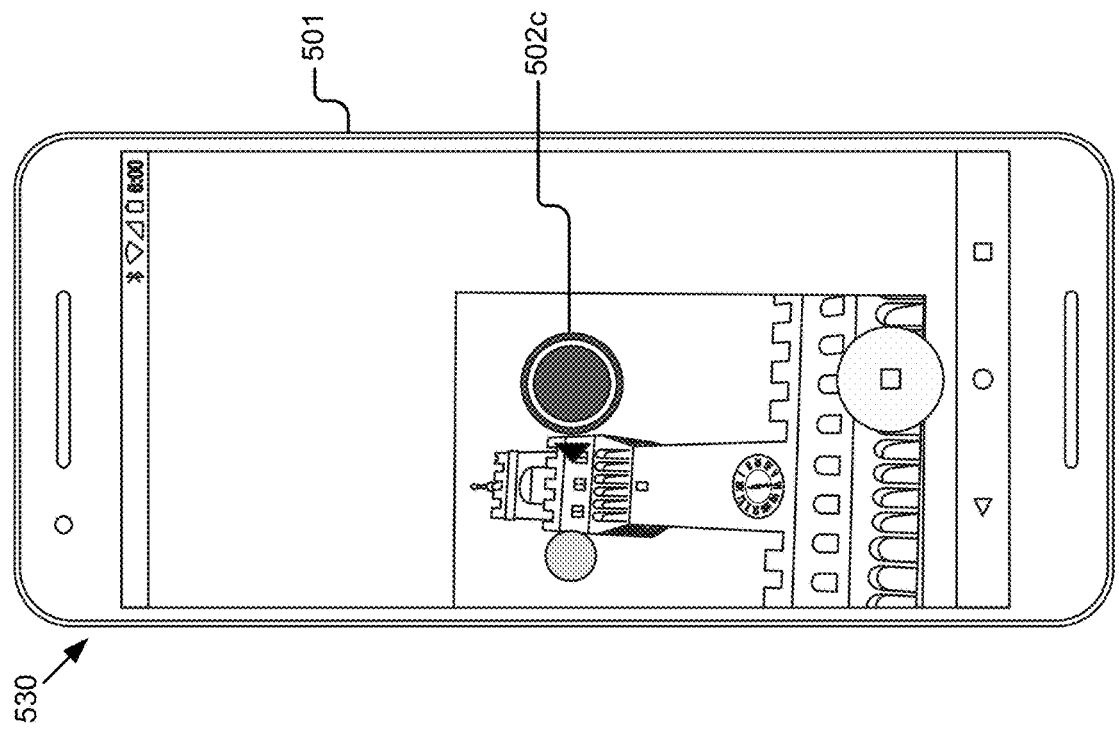
FIG. 5D illustrates a graphic representation of the mobile device displaying the overlay with the reticle surrounding a third object.
Figure 5C:
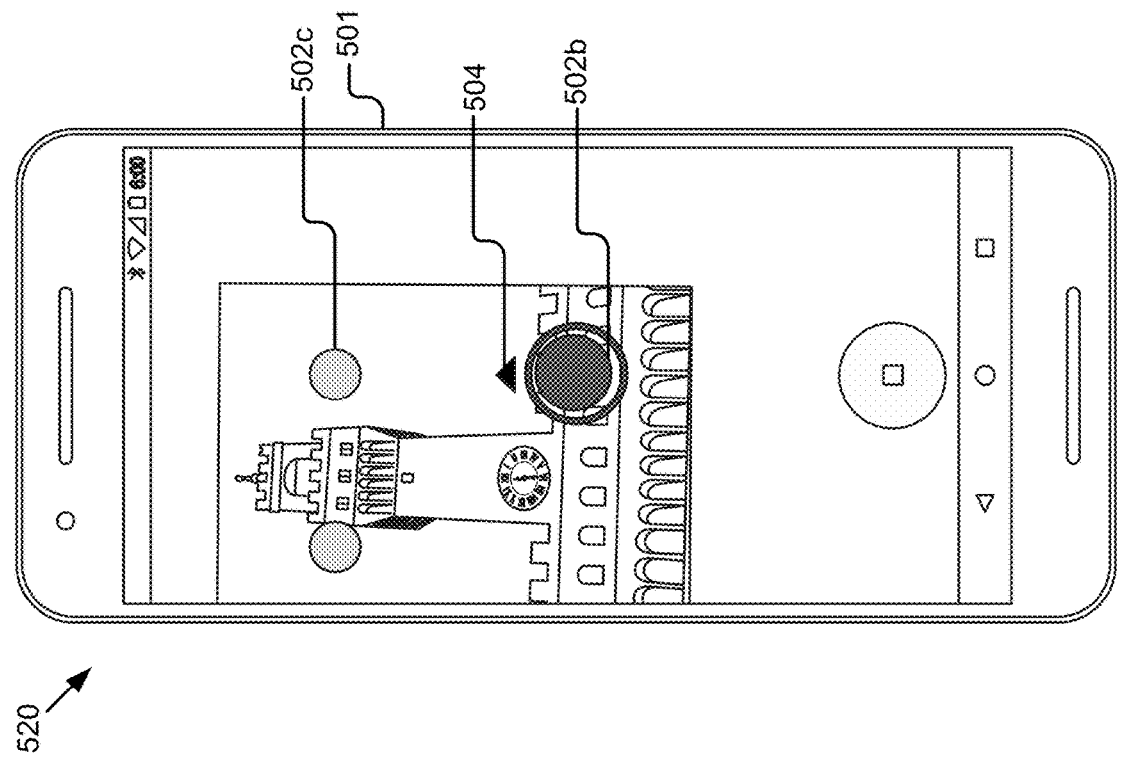
FIG. 5C illustrates a graphic representation of the mobile device displaying the overlay with the reticle surrounding a second object.

FIG. 5C illustrates a graphic representation 520 of the mobile device 501 displaying the overlay with the reticle 503 surrounding a second object 502b. In this example, the first object is removed from the overlay because the subsequent image or subsequent images for the corresponding quadrant have been captured. The arrow 504 points to the next object for the reticle 503 to surround, which is the third object 502c. FIG. 5D illustrates a graphic representation 530 of the mobile device 501 displaying the overlay with the reticle surrounding a third object 502c. FIG. 5E illustrates a graphic representation 540 of the mobile device 501 displaying the overlay with the reticle surrounding a fourth object 502d.

Figure 5F:
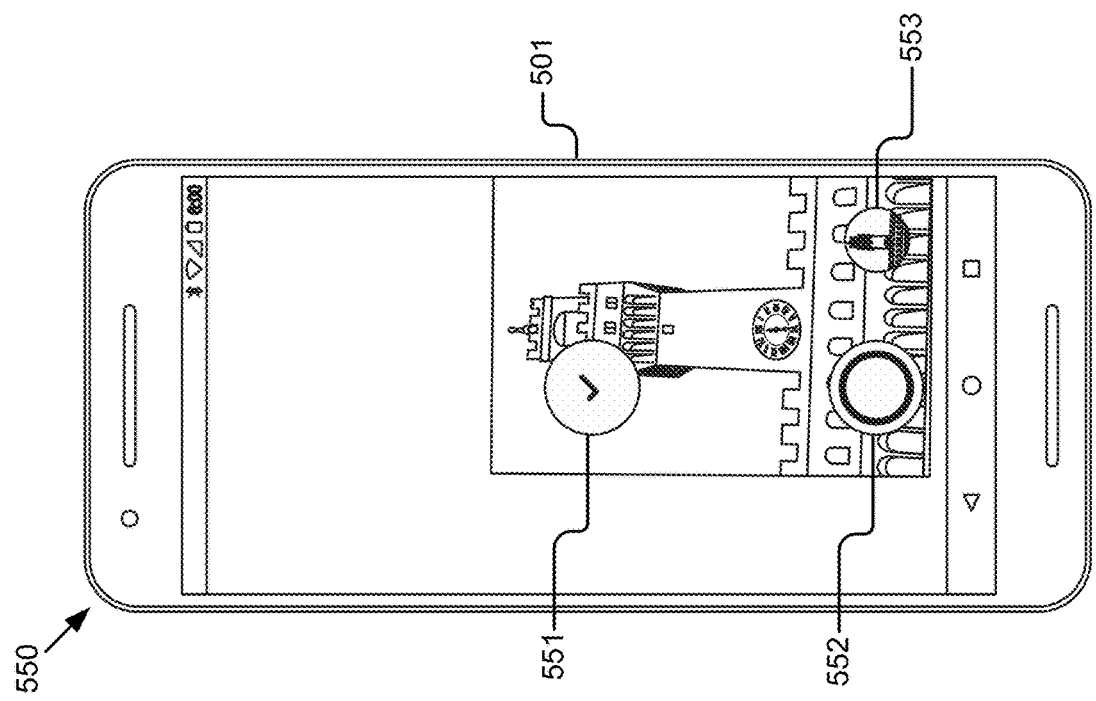
FIG. 5F illustrates a graphic representation of the mobile device displaying a completion of the capture process.
Figure 5E:
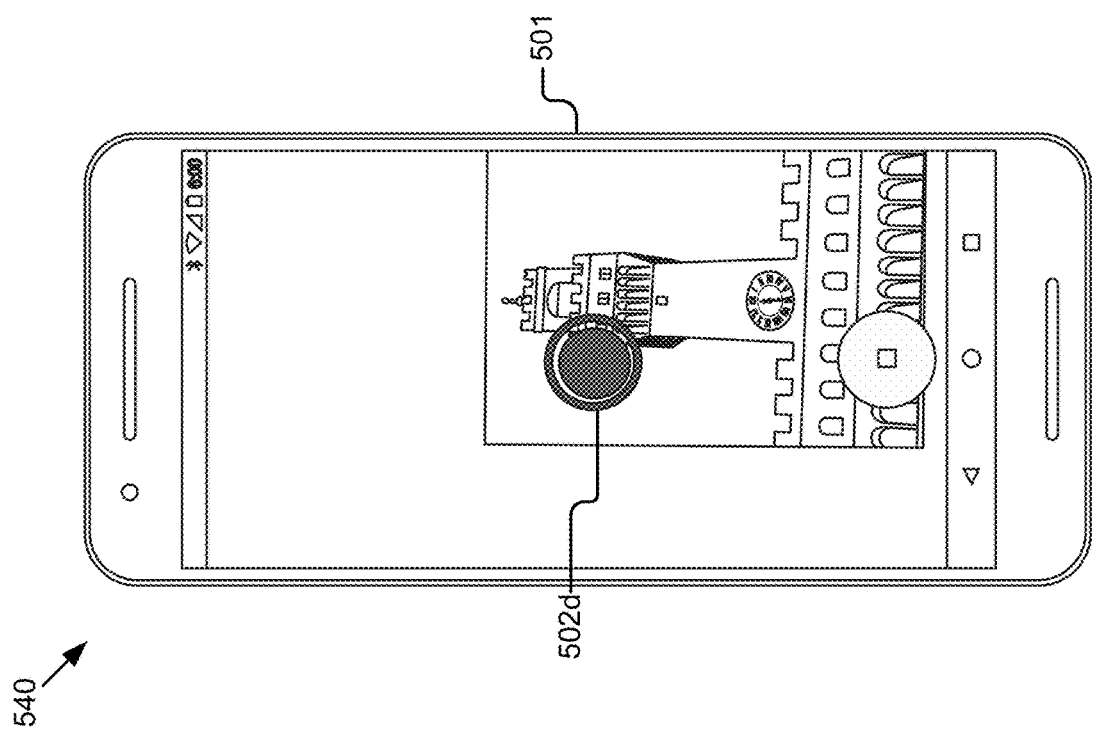
FIG. 5E illustrates a graphic representation of the mobile device displaying the overlay with the reticle surrounding a fourth object.

FIG. 5F illustrates a graphic representation 550 of the mobile device 501 displaying a completion of the capture process. In this example, the user interface module 204 replaces the fourth object with an indication of completion in the form of a checkmark icon 551. Other indications of completion are possible, such as a thumbs-up icon, a green color, a smiley face, etc. The user interface module 204 replaces the stop icon with another indication of completion in the form of a circle icon 552, such as a green circle. In this example, the composite module 206 generated a composite image and the user interface module 204 displays a composite image icon 553 that indicates that the composite image was generated and is available (e.g., stored) in mobile device 501. For example, the composite image may be stored in a camera roll, an image gallery, within a camera application, etc.

Figure 6B:
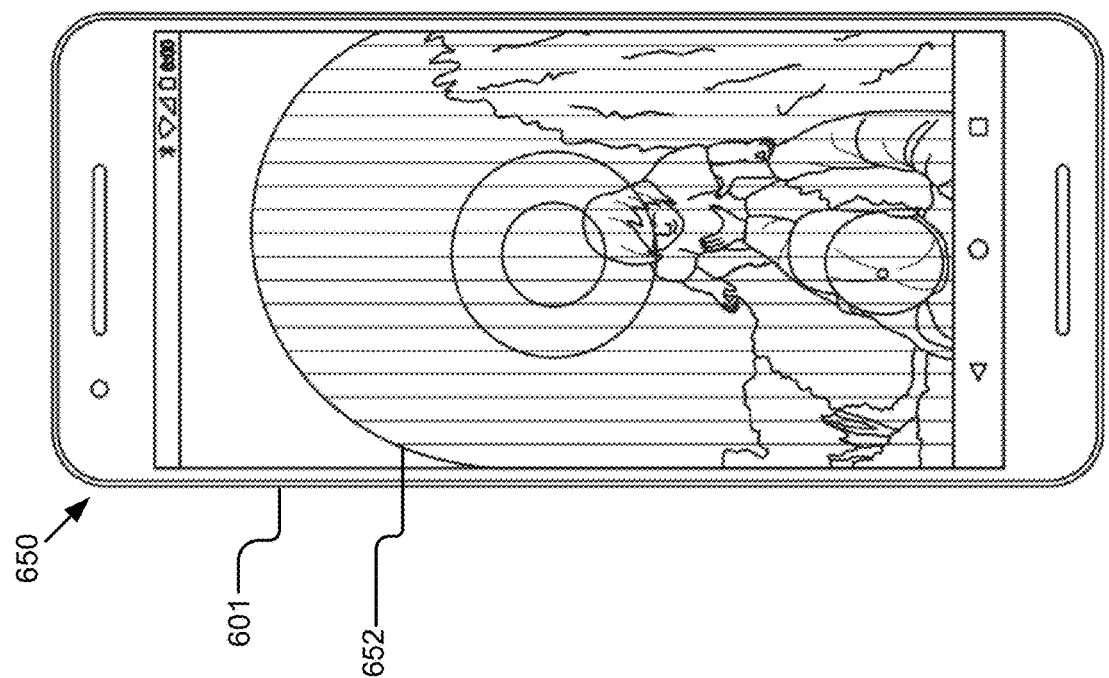
FIG. 6B illustrates a graphic representation of an example user interface with the color overlay over a second portion of the image according to some implementations.

In some implementations, the user interface module 204 displays the first image with a color overlay over a first portion of the first image. For example, the user interface module 204 generates a user interface that includes the first image and the color overlay at the bottom (or the top, middle, etc.) of the first image. The color may be any color, such as blue, black, green, etc. The process of capturing the first image and subsequent images until completion is illustrated in FIGS. 6A-6C as discussed in greater detail below.

Figure 6A:
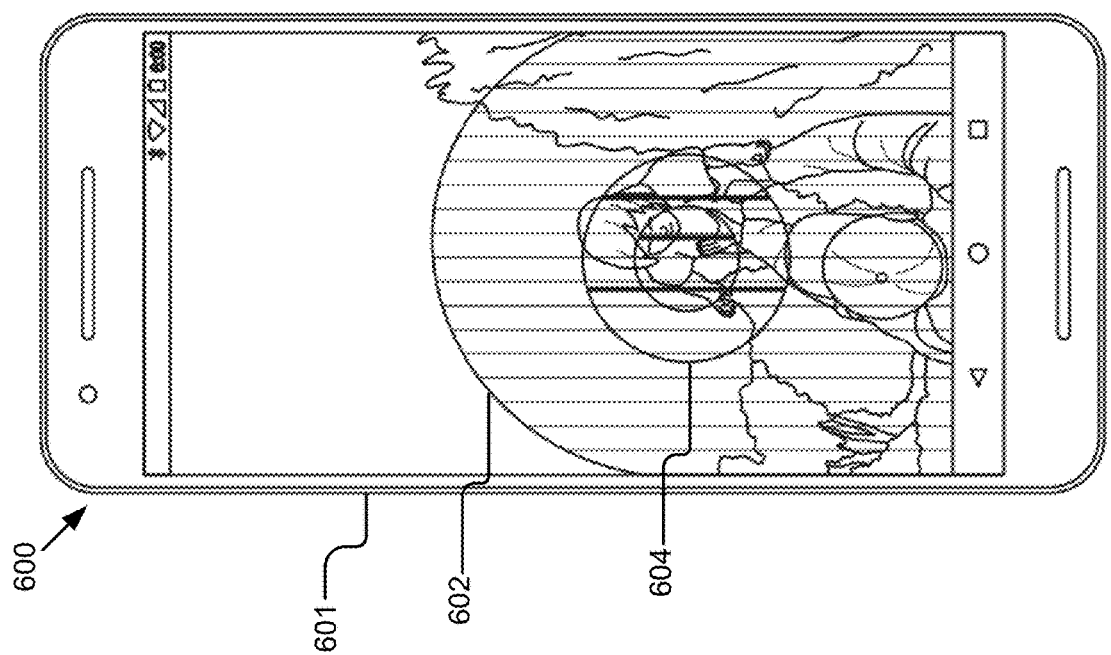
FIG. 6A illustrates a graphic representation of a mobile device displaying a color overlay over a first portion of an image according to some implementations.
Figure 6C:
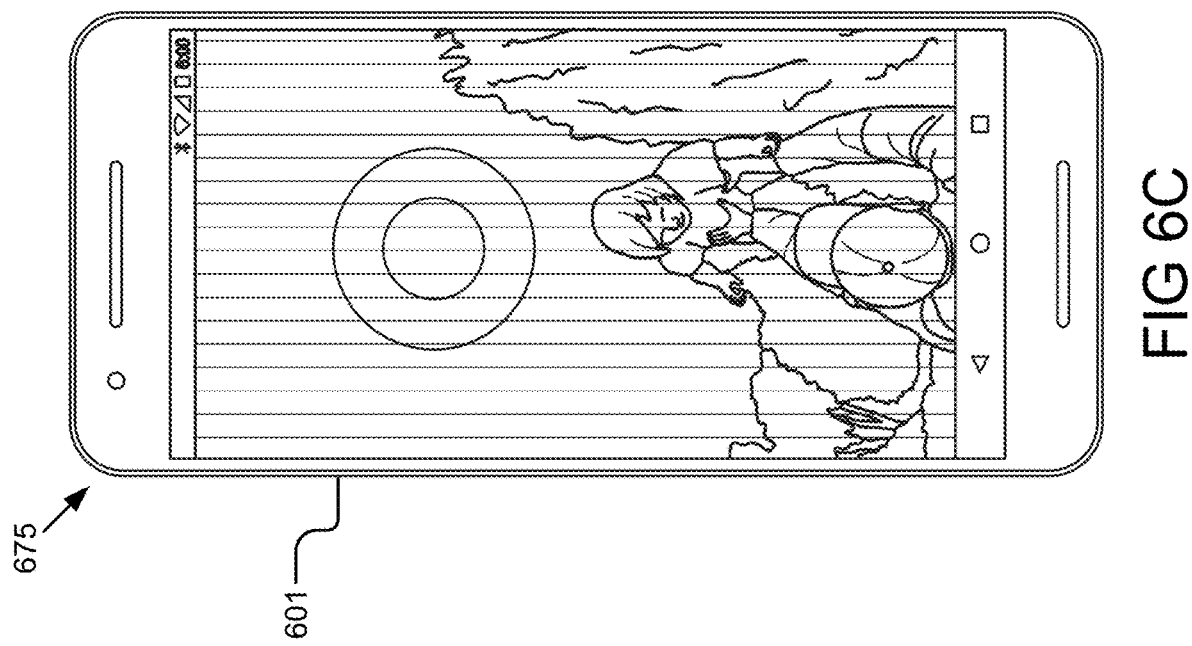
FIG. 6C illustrates a graphic representation of an example user interface with the color overlay over all of the image according to some implementations.

Turning to FIG. 6A, a graphic representation 600 of a mobile device 601 displaying a color overlay over a first portion of an image is illustrated. In this example, the color overlay includes about 40% of the image. The top of the color overlay is delineated with arc 602. In this example, the color overlay includes a target 604 that may move as the mobile device 601 moves. For example, if the user moves the mobile device 601 up, the target 604 may move upwards. In some implementations, the target 604 is positioned to indicate to the user the direction to move the mobile device 601. For example, in this example, the target 604 may be positioned to indicate to the user that the mobile device 601 should be moved upwards.

One or more subsequent images of the physical item may be captured, where each subsequent image is captured as the camera 243 is moved with reference to the physical item. For example, the user may move the mobile device 115 from left to right, up and down, or any other direction. In some implementations, the user moves the mobile device 115 as if the user was spray painting over the physical item. In some implementations, the user moves the mobile device 115 to capture a moving target. For example, the color overlay may include an icon of an object, such as a bee, and the user moves the mobile device 115 to capture the bee. The user interface module 204 may modify the location of the bee to ensure that the mobile device 115 is moved in a way to capture the subsequent images that cover different rotations and tilts to avoid glare or light reflection.

During capture of each of the subsequent images, the first image may be displayed with the color overlay over a second portion of the first image. The second portion may include the first portion and an additional portion determined based on movement of the camera. Turning to FIG. 6B, a graphic representation 650 of the color overlay over a second portion of the image is illustrated. In this example, the color overlay covers about 90% of the image and is delineated with the arc 652. The user may have used a left to right motion of the mobile device 601 to color the first image.

Turning to FIG. 6C, a graphic representation 675 of an example user interface with the color overlay over all of the image is illustrated. In this example, where the color overlay covers about 100% of the first image, the color overlay may indicate to the user that the spray painting process is complete.

In some implementations, the user interface module 204 generates a user interface that includes options for generating an electronic photo album from the composite image. For example, a user may use the process for generating a composite image for a box of old photos. The user interface module 204 may generate options for combining the composite images into different photo albums, adding titles to each of the composite images, upon user consent, tagging other users in the images, etc. The user interface module 204 may also generate options for editing the composite images, such as cropping, modifying a look of the composite images (e.g., changing color saturation, exposure, etc.), applying a filter, etc.

The composite module 206 generates a composite image. In some implementations, the composite module 206 includes a set of instructions executable by the processor 235 to generate the composite image. In some implementations, the composite module 206 is stored in the memory 237 of the computing device 300 and can be accessible and executable by the processor 235.

The composite module 206 establishes correspondence between pixels of the first image and pixels of each of the subsequent images. The composite module 206 may use homography to determine how the first image and the subsequent images are related. For example, the composite module 206 may generate a homography matrix based on rotation and translation between the images. The composite module 206 may use optical flow to determine apparent motion caused by relative motion between the camera 243 and the physical item. For example, the media application 103 may use optical flow to determine the motion that occurs between two images while the images were captured by the camera 243 during the capture of the first image and the subsequent images. The composite module 206 may use optical flow to identify glare on the image as a moving part.

The composite module 206 may use image registration to transform the pixels from the first image and the subsequent images into a single coordinate system. For example, the composite module 206 may generate a coordinate system that maps the location of each of the pixels based on the first image and the subsequent images. The composite module 206 may compare the pixel values for each pixel location and select a pixel value for the pixel location based on different factors. For example, the composite module 206 may determine that some of the pixel values represent glare. As a result, the composite module 206 may select the pixel value that corresponds to the darkest pixel since the other pixel value or values may represent glare instead of the pixel value for the color beneath the glare. In another example, the composite module 206 may determine that none of the pixel values for a particular pixel location represent glare. As a result, the composite module 206 may select the pixel value that represents the lightest pixel so that more detail from the physical item is represented in a composite image. In some implementations, the composite module 206 may select the pixel values to minimize blurriness that results from a shaky hand capturing the image.

The composite module 206 may generate a composite image of the physical item where each pixel value of the composite image is selected based on corresponding pixel values of the first image and the subsequent images. In some implementations, the composite module 206 uses sensor data to align the first image and the subsequent images to each other to identify the locations of the pixels. For example, the composite module 206 receives sensor data from the sensor 245 in the mobile device 115, such as sensor data from a gyroscope, accelerometer, etc. to determine a position of the mobile device 115 during capture and uses the sensor data to align the images. In some implementations, the images are aligned based on segmentation of the images. In some implementations, the composite module 206 uses the detected borders to align the first image and the subsequent images.

In some implementations, the composite module 206 avoids glare by selecting the minimum value of the corresponding pixel values. Other options are possible, such as performing statistical measures that include averaging the pixel values or obtaining a median value of the pixel values.

In some implementations, the composite module 206 may further select each pixel value by selecting a tentative pixel value and comparing the tentative pixel value to each of the surrounding pixel values to confirm that the pixel values are within a threshold difference of each other. If a tentative pixel value is different from one or more of the surrounding pixel values by more than a threshold difference, the composite module 206 may select a different pixel value that is within the threshold difference. This may ensure that the pixel values do not contain outlier pixel values.

The composite module 206 may combine the pixel values for each location in the first image and the subsequent images to form the composite image. The composite module 206 may store the composite image as a data file in an image format, such as PNG, PG, GIF, etc. In some implementations, the composite module 206 discards the first image and the subsequent images after the composite image is generated. In some implementations, the composite module 206 stores the first image and the subsequent images, either on the mobile device 115 or on the media server 101.

Example Concept Movies

In some implementations, the media application 103 generates concept movies from media associated with a user. The media application 103 may identify images and/or videos associated with a user that are associated with a particular concept. For example, the media application 103 may, upon user consent, identify images and/or videos of a single child spread over a length of time, such as five years. The concept may be "They Grow Up So Fast" and the images and videos may be organized chronologically to show the child aging. The media application 103 may generate a movie from the images and/or videos and add music to the movie. For example, the media application 103 may generate a movie that transitions between the images and/or the videos and is synchronized with the music, such as based on beats of the music. The media application 103 may select music that is emotional and corresponds to feelings evoked by watching the child aging, such as an emotional song designed to pull at the heartstrings.

In another example, the concept may be "Summer of Smiles" and on the last day of summer, the media application 103 may, upon user consent, select images and/or videos from the last three months where people are smiling. The music selected for the concept may be a song traditionally associated with summer.

Example Media Sharer

In some implementations, the media application 103 may make sharing media easier for users. The media application 103 may generate a user interface that provides a user with the user's media and an option to select multiple media items to share with other users. In some implementations, the media application 103 may provide an indicator on each of the media items that the user may select to indicate a desire to share. For example, the indicator may be a circle or a box and the media application 103 may add a checkmark responsive to the user selecting the media item by touching the screen.

In some implementations, the media application 103 may provide the user with an option to share the media item or items in multiple ways, including different types of applications. For example, the media application 103 may provide the user with an option to create a link to send to another person, generate a shared album that may be shared with another person, add the media item or items to a preexisting shared album, or share the media item or items with one or more messaging applications, messing applications, chat applications, email applications, cloud-computing storage, map applications, text-editing applications, etc. In some implementations, the media application 103 may suggest the mode of sharing based on the user's frequency of user, another person's frequency of use, etc. In some implementations where the user selects a messaging application, the media application 103 may provide a list of users and an indication of availability for the users.

In some implementations, the media application 103 may provide an option for the user to add text to the media item or items, such as a caption. In some implementations, the media application 103 may provide an option for the user to associate emojis with the media item or items. In some implementations, when the media item or items are delivered to a person, the media application 103 may display one emoji morphing into another emoji. For example, when a first user provides the caption "And it was great!!! ☺ Except, none of that happened ☹ ," the media application 103 may display the caption as "And it was great!!!" with the smiley faced emoji morphing into the sad-faced emoji and then the caption "Except, none of that happened."

In some implementations, the media application 103 may provide an option to share the media with people that are nearby and/or people in different regional locations, such as a town, country, etc. In some implementations, the media application 103 may provide an option to share the media offline. For example, the media application 103 may save the media to backup storage and share the media via SMS.

In some implementations, the media application 103 may, upon user consent, perform object identification and identification of people in the images. The media application 103 may, upon user consent, provide an option for the user to search the user's media based on objects, people, places, things, etc. In some implementations, the media application 103 may provide the user with an option to search for different types of things in the images by providing the user with example images.

In some implementations, the media application 103 may include an image assistant that detects problems with images captured by a user. For example, the images may be overexposed, blurry, etc. The media application may provide the user with an option to edit the image, for example, as included in FIG. 4. In some implementations, the media application 103 provides suggestions to the user, such as a warning that the images are blurry or the user is taking images that are similar to images the user has already captured. In some implementations, the media application 103 automatically corrects the images for the user.

In some implementations, the media application 103 provides an option to generate a photobook from media associated with a user.

Example Method

Figure 7:
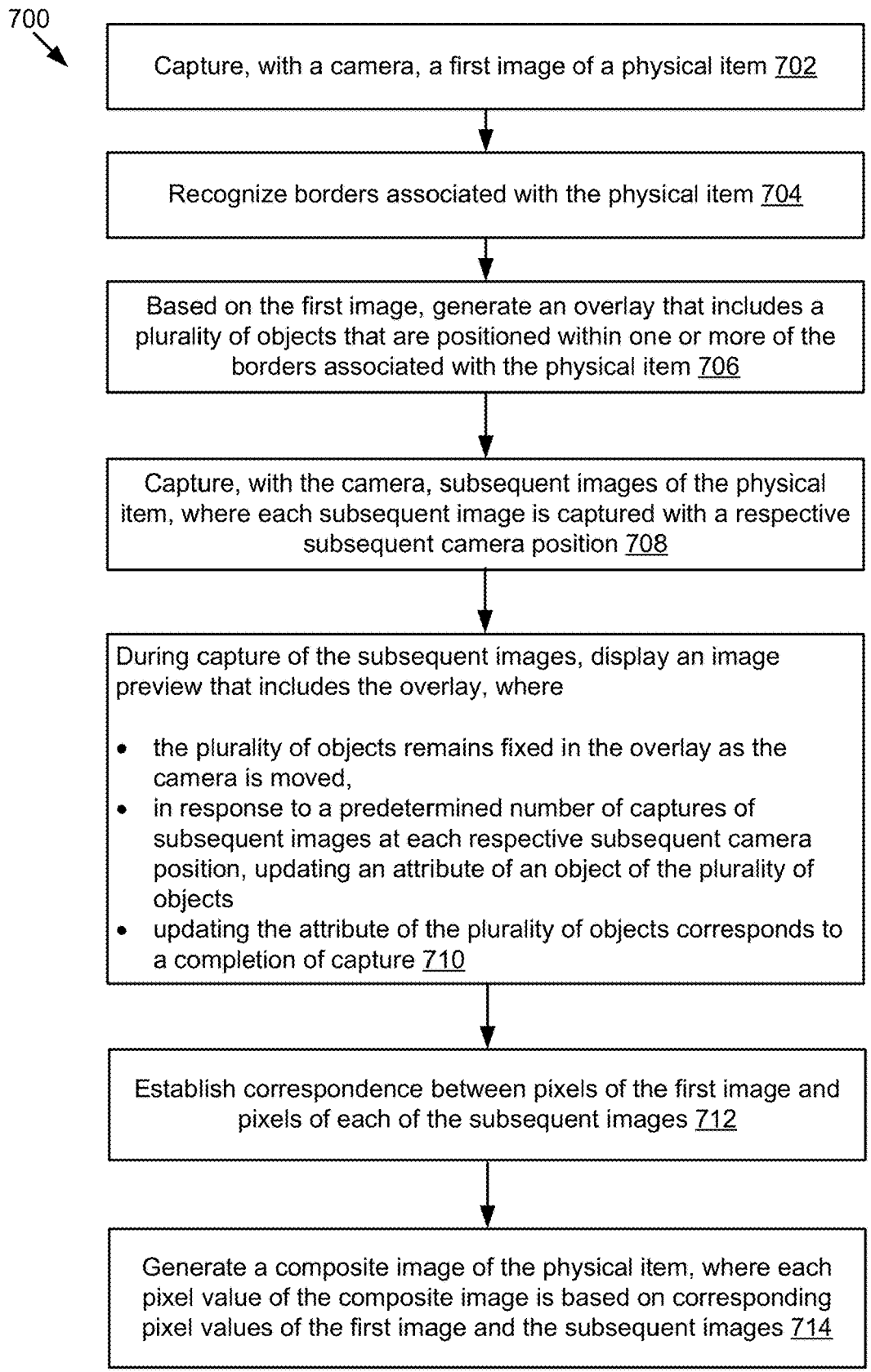
FIG. 7 illustrates a flowchart of an example method to generate a composite image from a physical item according to some implementations.

FIG. 7 illustrates a flowchart of an example method 700 to generate a composite image from a physical item according to some implementations. The method 700 is performed by a media application 103 stored on a computing device 300, such as a mobile device 115, a media server 111, or in part a mobile device 115 and in part a media server 111.

At block 702, a first image of a physical item is captured with a camera 243. The camera 243 is part of the computing device 300. The physical item is, for example, a photograph.

At block 704, borders associated with the physical item are recognized. For example, the computing device 300 identifies the four edges of the photograph.

At block 706, based on the first image, an overlay is generated that includes a plurality of objects that are positioned within one or more of the borders associated with the physical item. For example, the media application 103 divides the photograph into quadrants and generates an overlay with four objects that are each centered within one of the quadrants.

At block 708, subsequent images of the physical item are captured with the camera 243, where each subsequent image is captured with a respective subsequent camera position. For example, the media application 103 determines the movement of the camera 243 each time a subsequent image is captured. At block 710, during capture of the subsequent images, an image preview is displayed that includes the overlay, where the plurality of objects remains fixed in the overlay as the camera 243 is moved, in response to a predetermined number of captures of subsequent images at each respective subsequent camera position, an attribute of an object of the plurality of objects is updated, and updating the attribute of the plurality of objects corresponds to a completion of capture. For example, as a user moves the camera 243 a particular way, a respective object of the four objects changes color until the subsequent objects have been captured. In some implementations, the overlay includes a reticle that moves when the camera moves 243 and the reticle is moved to surround or overlap with at least a portion of each of the plurality of objects until the subsequent images have been captured and the result is a completion of capture.

At block 712, correspondence is established between pixels of the first image and pixels of the subsequent images. For example, the media application 103 compares all pixels at a particular location in the first image and the second image. At block 714, a composite image of the physical item is generated where each pixel value of the composite image is based on corresponding pixel values of the first image and the subsequent images. For example, the media application 103 selects the minimum value of the corresponding pixel values for the composite image for that particular location.

Figure 8:
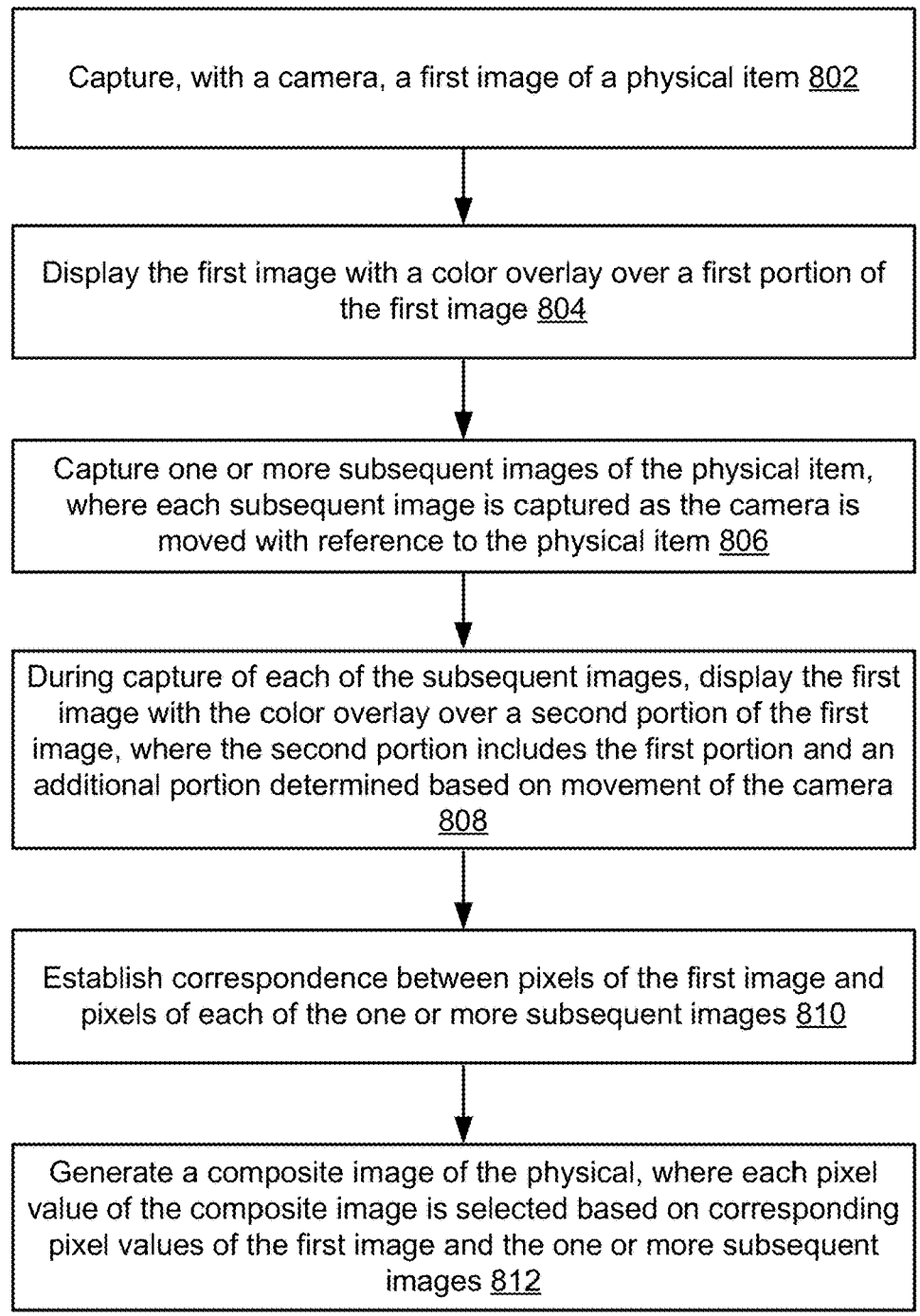
FIG. 8 illustrates a flowchart of another example method to generate a composite image from a physical item according to some implementations.

FIG. 8 illustrates a flowchart of another example method 800 to generate a composite image. The method 800 is performed by a media application 103 stored on a computing device 300, such as a mobile device 115, a media server 111, or in part a mobile device 115 and in part a media server 111.

At block 802, a first image of a physical item is captured with a camera. At block 804, the first image is displayed with a color overlay over a first portion of the image. At block 806 one or more subsequent images of the physical item are captured, where each subsequent image is captured as the camera is moved with reference to the physical item. At block 808, during capture of each of the subsequent images, the first image is displayed with the color overlay over a second portion of the first image, where the second portion includes the first portion and an additional portion determined based on movement of the camera. At block 810, correspondence is established between pixels of the first image and pixels of each of the one or more subsequent images. At block 812 a composite image of the physical item is generated, where each pixel value of the composite image is selected based on corresponding pixel values of the first image and the one or more subsequent images.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A method comprising:
capturing, with a camera, a first image of a physical item at a first camera position;
detecting edges associated with the physical item;
based on the first image, generating an overlay that includes a first object that is positioned within one or more of the edges associated with the physical item;
capturing, with the camera, subsequent images of the physical item, wherein each subsequent image is captured with a respective subsequent camera position;
during capture of the subsequent images, displaying an image preview that includes the overlay;
establishing correspondence between pixels of the first image and pixels of each of the subsequent images; and
generating a composite image of the physical item, wherein each pixel value of the composite image is based on corresponding pixel values of the first image and the subsequent images and the composite image depicts reduced or eliminated defects that occur when capturing one or more of the first image and the subsequent images.

2. The method of claim 1, wherein during capture of the subsequent images:
the first object remains fixed in the overlay as the camera is moved; and
in response to a predetermined number of captures of subsequent images at each respective subsequent camera position, removing the first object from the overlay to indicate a completion of capture of the subsequent images associated with the respective subsequent camera position.

3. The method of claim 1, wherein:
the overlay further includes a second object;
the overlay further comprises a reticle that moves from the first object to the second object as the camera is moved; and
the subsequent images are captured responsive to at least a portion of the reticle overlapping with the first object and then overlapping with the second object.

4. The method of claim 3, wherein the overlay further includes an arrow that directs the camera to be moved from the first object to the second object.

5. The method of claim 3, wherein the reticle is illustrated as a spinner that progressively changes to indicate an amount of time needed for the camera to capture a subset of the subsequent images while at least the portion of the reticle overlaps with the second object.

6. The method of claim 3, wherein:
the reticle is displayed at a fixed size and the first object is displayed at an object size that corresponds to a distance between the physical item and the camera;
the object size of the first object increases in the overlay as the camera is moved closer to physical item; and
the object size corresponds to the fixed size of the reticle when the camera is at an optimal distance from the physical item.

7. The method of claim 1, wherein responsive to the first camera position for the first image being an angle, the overlay is displayed with the first object at the angle.

8. A non-transitory computer-readable medium with instructions that, when executed by one or more computers, cause the one or more computers to perform operations comprising:
capturing, with a camera, a first image of a physical item at a first camera position;
detecting edges associated with the physical item;
based on the first image, generating an overlay that includes a first object that is positioned within one or more of the edges associated with the physical item;
capturing, with the camera, subsequent images of the physical item, wherein each subsequent image is captured with a respective subsequent camera position;
during capture of the subsequent images, displaying an image preview that includes the overlay;
establishing correspondence between pixels of the first image and pixels of each of the subsequent images; and
generating a composite image of the physical item, wherein each pixel value of the composite image is based on corresponding pixel values of the first image and the subsequent images and the composite image depicts reduced or eliminated defects that occur when capturing one or more of the first image and the subsequent images.

9. The computer-readable medium of claim 8, during capture of the subsequent images:
the first object remains fixed in the overlay as the camera is moved; and
in response to a predetermined number of captures of subsequent images at each respective subsequent camera position, removing the first object from the overlay to indicate a completion of capture of the subsequent images associated with the respective subsequent camera position.

10. The computer-readable medium of claim 8, wherein:
the overlay further includes a second object;
the overlay further comprises a reticle that moves from the first object to the second object as the camera is moved; and
the subsequent images are captured responsive to at least a portion of the reticle overlapping with the first object and then overlapping with the second object.

11. The computer-readable medium of claim 10, wherein the overlay further includes an arrow that directs the camera to be moved from the first object to the second object.

12. The computer-readable medium of claim 10, wherein the reticle is illustrated as a spinner that progressively changes to indicate an amount of time needed for the camera to capture a subset of the subsequent images while at least the portion of the reticle overlaps with the second object.

13. The computer-readable medium of claim 10, wherein:
the reticle is displayed at a fixed size and the first object is displayed at an object size that corresponds to a distance between the physical item and the camera;
the object size of the first object increases in the overlay as the camera is moved closer to physical item; and
the object size corresponds to the fixed size of the reticle when the camera is at an optimal distance from the physical item.

14. The computer-readable medium of claim 8, wherein responsive to the first camera position for the first image being an angle, the overlay is displayed with the first object at the angle.

15. A system comprising:
one or more processors; and
a memory that stores instructions executable by the one or more processors that, when executed by the one or more processors, cause the one or more processors to perform operations comprising:
capturing, with a camera, a first image of a physical item at a first camera position;
detecting edges associated with the physical item;

based on the first image, generating an overlay that includes a first object that is positioned within one or more of the edges associated with the physical item;

capturing, with the camera, subsequent images of the physical item, wherein each subsequent image is captured with a respective subsequent camera position;

during capture of the subsequent images, displaying an image preview that includes the overlay;

establishing correspondence between pixels of the first image and pixels of each of the subsequent images; and generating a composite image of the physical item, wherein each pixel value of the composite image is based on corresponding pixel values of the first image and the subsequent images and the composite image depicts reduced or eliminated defects that occur when capturing one or more of the first image and the subsequent images.

16. The system of claim 15, wherein during capture of the subsequent images:

the first object remains fixed in the overlay as the camera is moved; and in response to a predetermined number of captures of subsequent images at each respective subsequent camera position, removing the first object from the overlay to indicate a completion of capture of the subsequent images associated with the respective subsequent camera position.

17. The system of claim 15, wherein:

the overlay further includes a second object;

the overlay further comprises a reticle that moves from the first object to the second object as the camera is moved; and the subsequent images are captured responsive to at least a portion of the reticle overlapping with the first object and then overlapping with the second object.

18. The system of claim 17, wherein the overlay further includes an arrow that directs the camera to be moved from the first object to the second object.

19. The system of claim 17, wherein the reticle is illustrated as a spinner that progressively changes to indicate an amount of time needed for the camera to capture a subset of the subsequent images while at least the portion of the reticle overlaps with the second object.

20. The system of claim 17, wherein:

the reticle is displayed at a fixed size and the first object is displayed at an object size that corresponds to a distance between the physical item and the camera;

the object size of the first object increases in the overlay as the camera is moved closer to physical item; and the object size corresponds to the fixed size of the reticle when the camera is at an optimal distance from the physical item.

* * * * *